(12) United States Patent
Friedman

(10) Patent No.: US 12,294,394 B2
(45) Date of Patent: May 6, 2025

(54) DISTRIBUTING STAGED SAMPLED SIGNALS AND CONVEYING ANALOG SAMPLES OVER ELECTROMAGNETIC PATHWAYS

(71) Applicant: HYPHY USA INC., San Jose, CA (US)

(72) Inventor: Eyal Friedman, Cheltenham (AU)

(73) Assignee: HYPHY USA Inc., San Jose, CA (US)

( * ) Notice: Subject to any disclaimer, the term of this patent is extended or adjusted under 35 U.S.C. 154(b) by 20 days.

(21) Appl. No.: 18/334,953

(22) Filed: Jun. 14, 2023

(65) Prior Publication Data

US 2023/0327689 A1 Oct. 12, 2023

Related U.S. Application Data

(63) Continuation of application No. 17/879,499, filed on Aug. 2, 2022, now Pat. No. 12,176,933.
(Continued)

(51) Int. Cl.
*H04B 1/04* (2006.01)

(52) U.S. Cl.
CPC ..................................... *H04B 1/04* (2013.01)

(58) Field of Classification Search
CPC .......... H03D 1/00; H03M 13/03; H04B 1/02; H04B 1/04; H04B 1/06; H04B 1/69;
(Continued)

(56) References Cited

U.S. PATENT DOCUMENTS 3,204,035 A 8/1965 Ballard et al.
3,795,765 A 3/1974 DeGroat et al.
(Continued)

FOREIGN PATENT DOCUMENTS

CN 101933277 12/2010
CN 101969319 2/2011
(Continued)

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.
(Continued)

*Primary Examiner* — Shawkat M Ali
(74) *Attorney, Agent, or Firm* — Beyer Law Group LLP

(57) ABSTRACT

In a transmitter there is a distributor and assembly bank into which a predetermined quantity of an input payload from a source is repeatedly written according to a first distributor permutation to create as many input vectors as there are electromagnetic propagation pathways. A staging bank exists into which each input vector available from the assembly bank are repeatedly written according to a second distributor permutation. A presentation bank exists into which each input vector available from the staging bank are repeatedly written according to a third distributor permutation. One or more encoders repeatedly encode input vectors from the presentation bank; there being as many encoders as electromagnetic propagation pathways, and each encoder makes available each encoded ordered series of output levels for communication over the pathways. The banks and encoders are in up to four timing domains. A corresponding receiver, decoder, and reception, staging and disassembly banks and a sink are at the end of the pathways.

15 Claims, 31 Drawing Sheets

Generic Distributor

Related U.S. Application Data

(60) Provisional application No. 63/232,486, filed on Aug. 12, 2021.

(58) Field of Classification Search
CPC .......... H04B 1/707; H04J 13/10; H04N 5/92; H04N 7/01; H04N 7/10; H04N 17/00; H04N 19/186; H04N 21/436; H04N 21/4363
USPC ......... 375/219, 295, 316, 341; 714/792, 795
See application file for complete search history.

(56) References Cited

U.S. PATENT DOCUMENTS

| | | | |
|---|---|---|---|
| 5,793,759 A | 8/1998 | Rakib et al. |
| 5,796,774 A | 8/1998 | Kato |
| 5,870,414 A | 2/1999 | Chaib et al. |
| 5,936,997 A | 8/1999 | Kanda |
| 5,938,787 A | 8/1999 | Stark et al. |
| 5,956,333 A | 9/1999 | Zhou et al. |
| 5,966,376 A | 10/1999 | Rakib et al. |
| 6,018,547 A | 1/2000 | Arkhipkin |
| 6,128,309 A | 10/2000 | Tariki et al. |
| 6,154,456 A | 11/2000 | Rakib et al. |
| 6,289,039 B1 | 9/2001 | Garodnick |
| 6,310,923 B1 | 10/2001 | Lee et al. |
| 6,456,607 B2 | 9/2002 | Arai et al. |
| 6,480,559 B1 | 11/2002 | Dabak et al. |
| 6,751,247 B1 | 6/2004 | Zhengdi |
| 6,763,009 B1 | 7/2004 | Bedekar et al. |
| 6,956,891 B2 | 10/2005 | Tan et al. |
| 7,710,910 B2 | 5/2010 | Ode et al. |
| 7,793,022 B2 | 9/2010 | Travers et al. |
| 7,796,575 B2 | 9/2010 | Lim et al. |
| 7,873,097 B1 | 1/2011 | Luecke et al. |
| 7,873,980 B2 | 1/2011 | Horan et al. |
| 7,908,634 B2 | 3/2011 | Keady et al. |
| 7,937,605 B2 | 5/2011 | Rea et al. |
| 7,996,584 B2 | 8/2011 | Keady et al. |
| 8,073,647 B2 | 12/2011 | Horan et al. |
| 8,094,700 B2 | 1/2012 | Okazaki |
| 8,272,023 B2 | 9/2012 | Horan et al. |
| 8,280,668 B2 | 10/2012 | Horan et al. |
| 8,295,296 B2 | 10/2012 | Keady et al. |
| 8,369,794 B1 | 2/2013 | Bharghavan et al. |
| RE44,199 E | 5/2013 | Garodnick |
| 8,520,776 B2 | 8/2013 | Rea et al. |
| 8,546,688 B2 | 10/2013 | Horan et al. |
| 8,674,223 B2 | 3/2014 | Horan et al. |
| 8,674,224 B2 | 3/2014 | Horan et al. |
| 8,674,225 B2 | 3/2014 | Horan et al. |
| 8,674,226 B2 | 3/2014 | Horan et al. |
| 8,680,395 B2 | 3/2014 | Horan et al. |
| 8,705,588 B2 | 4/2014 | Odenwalder |
| 9,324,478 B2 | 4/2016 | Horan et al. |
| 9,756,363 B2 | 9/2017 | Park et al. |
| 9,970,768 B2 | 5/2018 | Monroe et al. |
| 10,158,396 B2 | 12/2018 | Hannebauer et al. |
| 10,763,914 B2 | 9/2020 | Hannebauer et al. |
| 11,025,292 B2 | 6/2021 | Hannebauer et al. |
| 11,394,422 B2 | 7/2022 | Hannebauer et al. |
| 11,463,125 B2 | 10/2022 | Hannebauer et al. |
| 2002/0013926 A1 | 1/2002 | Kim et al. |
| 2002/0097779 A1 | 7/2002 | Bang et al. |
| 2002/0162074 A1* | 10/2002 | Bickerstaff ....... H03M 13/6502 |
| | | | 714/792 |
| 2003/0139178 A1 | 7/2003 | Uesugi et al. |
| 2004/0120415 A1 | 6/2004 | Song et al. |
| 2005/0069020 A1 | 3/2005 | Lakkis |
| 2006/0080711 A1 | 4/2006 | Kim |
| 2008/0084920 A1 | 4/2008 | Okazaki |
| 2008/0106306 A1 | 5/2008 | Keady et al. |
| 2009/0040167 A1 | 2/2009 | Sun |
| 2009/0046044 A1 | 2/2009 | Chen |
| 2009/0296840 A1 | 12/2009 | Atungsiri et al. |
| 2010/0013579 A1 | 1/2010 | Horan et al. |
| 2010/0091990 A1 | 4/2010 | Etemad et al. |
| 2010/0142723 A1 | 6/2010 | Bucklen |
| 2010/0321591 A1 | 12/2010 | Onomatsu |
| 2011/0037574 A1 | 2/2011 | Pratt et al. |
| 2011/0044409 A1 | 2/2011 | Yoshimoto et al. |
| 2012/0014464 A1 | 1/2012 | Eiger et al. |
| 2012/0047229 A1 | 2/2012 | Bennett |
| 2014/0077706 A1 | 3/2014 | Aldrich et al. |
| 2014/0218616 A1 | 8/2014 | Toba et al. |
| 2014/0340431 A1 | 11/2014 | Yamakawa |
| 2016/0127087 A1 | 5/2016 | Feher |
| 2018/0027257 A1* | 1/2018 | Izumi ................... H04N 13/00 |
| | | | 386/328 |
| 2018/0337687 A1 | 11/2018 | Adjiwibawa et al. |
| 2019/0088227 A1 | 3/2019 | Matsumoto |
| 2019/0174027 A1 | 6/2019 | Lv et al. |
| 2019/0260629 A1 | 8/2019 | Nikopour et al. |
| 2019/0342564 A1 | 11/2019 | Kurokawa |
| 2020/0014419 A1* | 1/2020 | Hannebauer .......... H04B 1/707 |
| 2021/0203904 A1 | 7/2021 | Wetzstein et al. |
| 2021/0327366 A1 | 10/2021 | Maeda et al. |
| 2022/0101799 A1 | 3/2022 | Lee et al. |
| 2022/0302953 A1 | 9/2022 | Hannebauer et al. |
| 2023/0139147 A1 | 5/2023 | Chae |
| 2024/0212576 A1 | 6/2024 | Lee et al. |

FOREIGN PATENT DOCUMENTS

| | | |
|---|---|---|
| CN | 101917209 | 7/2015 |
| CN | 210390948 | 4/2020 |
| EP | 0 727 881 | 8/1996 |
| EP | 1 079 536 | 2/2001 |
| EP | 1 968 324 | 9/2008 |
| EP | 3979229 | 4/2022 |
| JP | 08293818 | 11/1996 |
| JP | H09312590 | 12/1997 |
| JP | 2001-144653 | 5/2001 |
| JP | 2001156861 | 6/2001 |
| JP | 2001510658 | 7/2001 |
| JP | 2002281545 | 9/2002 |
| JP | 2007-150971 | 6/2007 |
| JP | 2011003331 | 6/2011 |
| KR | 10-2016-0045759 | 4/2016 |
| KR | 10-2019-0026701 | 3/2019 |
| KR | 10-2020-0124147 | 11/2020 |
| WO | WO 97/02663 | 1/1997 |
| WO | WO 98/52365 | 11/1998 |
| WO | WO 2007/075052 | 7/2007 |
| WO | 2010/106330 | 9/2010 |
| WO | 2018-170546 | 9/2010 |
| WO | WO 2012/007785 | 1/2012 |
| WO | WO 2017/049347 | 3/2017 |

OTHER PUBLICATIONS

Van der Heijden, "An Analog Correlator for a High Speed DS-CDMA Modem", Eindhoven University of Technology, Department of Electrical Engineering Telecommunication Technology and Electromagnetics, 1998, 65 pages.

Shanmugam et al., "An Analog Spread-Spectrum Interface for Power-Line Data Communication in Home Networking", IEEE transactions on Power Delivery, vol. 20, No. 1, Jan. 2005.

Immink, "Construction of DC-free Codes Using the fast Hadamard Transform", Nov. 7, 2001, 6 pages.

Search Report and Written Opinion dated Nov. 24, 2022 from International Application No. PCT/US2022/039176.

* cited by examiner

Source Example

Sink Example

Source TX Rx Sink

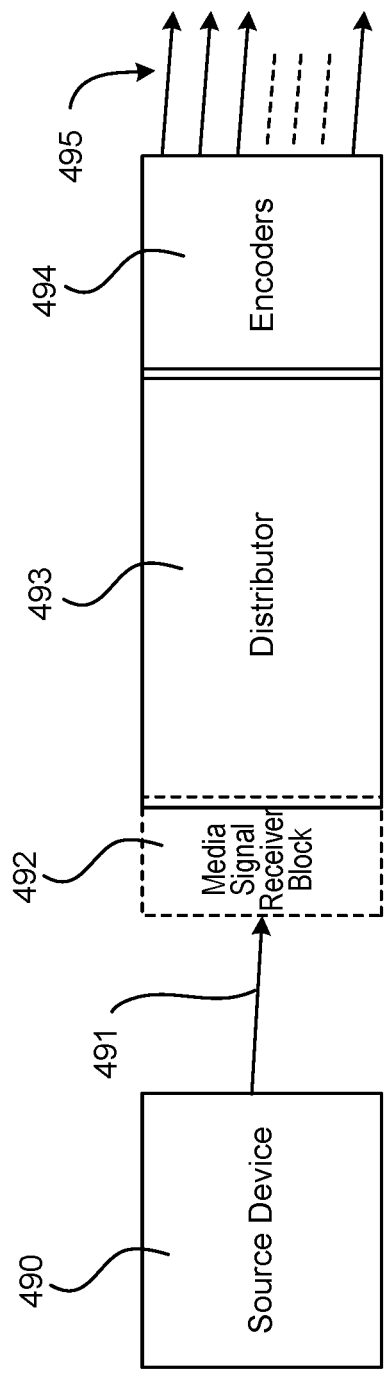

Transmitter Embodiment

Cross Sections
8K60YCbCr 20bpp:
P=4,
N=64,
L=128,
S=2,
SW=10

| Timing Domain | pix | pix_bank | ssvt_bank | ssvt |
|---|---|---|---|---|
| # Signals | S<br>2 | P×N<br>256 | P×N<br>256 | P<br>4 |
| Sample Width (bits) | SW<br>10 | SW<br>10 | SW<br>10 | LW = SW + log(N) +1<br>17 |
| Update Rate (GHz) | $f_{pix}$<br>2.4 | $\frac{f_{pix} * S}{N * P}$<br>0.019 | $\frac{f_{ssvt}}{L}$<br>0.019 | $f_{ssvt}=f_{pix} *\frac{S}{P} *\frac{L}{N}$<br>2.4 |

*FIG. 4C*

Timing Domains and Parameter Values
for FIG. 4B Embodiment

Color coding of timing domains

Generic Distributor

Distributor

Distributor Architecture

Processor-Based first Transmitter Permutation Controller

Transmitter permutation controller implemented as a shift register

Encoder (x4) relate to N1

Generic Receiver Assembly

Embodiment of a Receiver Assembly

Cross Sections
8K120YCbCr 20bpp:
P=4, #pathways,
N=64, #tracks / decoder,
L=128, #chips / code,
S=2, #samples / pix_clk cycle,
SW=10 #bits / sample

| Timing Domain | ssvt | ssvt_bank | pix_bank | pix |
|---|---|---|---|---|
| # Signals | $P$<br>4 | $P \times N$<br>256 | $P \times N$<br>256 | $S\ (=R)$<br>2 |
| Sample Width (bits) | $LW = SW + \log(N) + 1$<br>17 | $SW$<br>10 | $SW$<br>10 | $SW$<br>10 |
| Update Rate (GHz) | $f_{ssvt} = f_{pix} * \dfrac{S}{P} * \dfrac{L}{N}$<br>4.8      0.037 | $\dfrac{f_{ssvt}}{L}$<br>0.037 | $\dfrac{f_{pix}}{P} * \dfrac{S}{SF}$<br>0.037 | $f_{pix}$<br>4.8 |

FIG. 12B

Parameter Values

Collector Embodiment

Collector Embodiment

Collector Embodiment

First receiver permutation controller

Second receiver permutation controller

Grey-code based distributing permutation

Collector permutation (Inverse of Fig. 16)

Sink collector creating a reconstructed payload

Display driver sink receiving reconstructed payload

Implementation of asynchronous relationship between the distributing interval and the encoder interval in the distributor Implementation of asynchronous relationship between the collecting interval and the decoder interval in the collector Encoding of Analog Values

DISTRIBUTING STAGED SAMPLED SIGNALS AND CONVEYING ANALOG SAMPLES OVER ELECTROMAGNETIC PATHWAYS

This application is a continuation of U.S. patent application Ser. No. 17/879,499, filed on Aug. 2, 2022, which claims priority to U.S. provisional patent application No. 63/232,486, filed Aug. 12, 2021. This application incorporates by reference U.S. application Ser. No. 15/925,123, filed on Mar. 19, 2018, now U.S. Pat. No. 10,158,396, U.S. application Ser. No. 16/494,901 filed on Sep. 17, 2019, U.S. application Ser. No. 17/686,790, filed on Mar. 4, 2022, U.S. provisional patent application No. 63/280,017, filed Nov. 16, 2021, and U.S. provisional patent application No. 63/317,746, filed Mar. 8, 2022.

FIELD OF DISCLOSURE

Conveying sampled signals, in particular media signals, between equipment pairs connected by electromagnetic (EM) propagation pathways.

BACKGROUND

It is known from WO2017/049347 and WO2018/170546 both in the name of the present applicant, and where allowable incorporated by reference into this specification, that it is possible to convey sampled media signals between uphill and downhill assemblies connected by one or more EM pathways. The uphill location being referred to alternatively and equivalently as the source and the downhill location being the sink.

The mention of WO2017/049347 and WO2018/170546 are in no way indicative that they are part of the common general knowledge of persons of skill in the art of media signal transport as of the date of this disclosure.

All existing media interfaces used in the relevant industry have limitations especially when the video media signal needs to be transported over long distances over existing electromagnetic pathways, such as cable and twisted pairs, which can adversely affect the human viewing experience of the video when displayed at the sink. It has been identified by the inventors of the signal transport methods and apparatus disclosed in WO 2017/049347 and WO2018/170546 that an important aspect of the hardware and software disclosed therein are improvements of hardware and software that provides the ability to distribute those media signals at the source and correspondingly collect those signals at the sink in a manner that best suits the signal transport methods and apparatus disclosed in WO 2017/049347 and WO2018/170546.

ASPECTS OF THE DISCLOSURE

In an aspect there is a system for repeatedly communicating an input payload received from a source, the input payload comprising one or more sampled signals for communication over one or more electromagnetic propagation pathways. The system comprises a first apparatus comprising a transmitter permutation controller having a first transmitter permutation controller having at least a memory for storing distributor permutations, the first transmitter permutation controller for executing one or more predetermined distributor permutations, one of which is for distributing a predetermined quantity of input payload sampled signals into a predetermined quantity of input vectors, wherein the first transmitter permutation controller executes one or more predetermined distributor permutations within a repeating predetermined distributing interval. The first transmitter permutation controller further having a distributor counter to indicate the boundary of the predetermined distributing interval. In this aspect, there is a first distributor having a first memory array into which the predetermined quantity of input payload is repeatedly written according to a first predetermined distributor permutation there being as many input vectors as there are electromagnetic propagation pathways and there being none, one or more memory locations; a second memory array into which the input vectors available from the first memory array are repeatedly written, according to a second predetermined distributor permutation when the first counter indicates the boundary of the distributing interval. In this aspect, there is a second transmitter permutation controller for transferring input vectors within the predetermined encoding interval and the second transmitter permutation controller further having an encoder counter to indicate the boundary of the predetermined encoding interval. In this aspect the system also comprises a second distributor having a third memory array into which the input vectors available from the second memory array are repeatedly written when the second counter indicates the boundary of the predetermined encoding interval; one or more encoders for repeatedly encoding input vectors within the predetermined encoding interval; there being as many encoders as electromagnetic propagation pathways, each encoder receiving a respective input vector, the encoding of the input vector being with reference to a predetermined encoding code set for each encoder, wherein each encoding code is a unique indexed sequence of chips and each of the encoding codes is orthogonal to each other encoding code and DC balanced with respect to all encoding codes in the predetermined encoding code set; each encoder output being an ordered series of output levels and each encoder making available each encoded ordered series of output levels for communication over a respective electromagnetic propagation pathway. In an aspect, the system also comprises a second apparatus for receiving from each of one or more electromagnetic propagation pathways an ordered series of encoded levels.

In this aspect the second apparatus comprises, a sampler for each electromagnetic propagation pathway for transforming the ordered series of levels into encoded levels; one or more decoders for repeatedly decoding and using one each of the decoders for each electromagnetic propagation pathway wherein within a predetermined decoding interval, each decoder decodes encoded levels provided by the sampler associated with a respective electromagnetic propagation pathway, each decoding being with reference to a predetermined decoding code set for each decoder, wherein each decoding code set is the inverse of the corresponding predetermined encoding code set, wherein the output of each of the decoders is an ordered series of decoded output samples.

In this aspect the second apparatus also comprises, a first receiver permutation controller for executing one or more predetermined collector permutations wherein the first receiver permutation controller executes the one or more permutations within a predetermined encoding interval; and the first receiver permutation controller further having, a decoder counter to indicate the end of the decoding interval; a first collector having, a fourth memory array into which are repeatedly written as many decoded output vectors from the one or more decoders, and the first collector further having a fifth memory array into which the output vectors available from the fourth memory array are repeatedly written, when the decoder counter indicates the boundary of the decoding interval.

In this aspect the second apparatus also comprises, a second receiver permutation controller for executing one or more predetermined collector permutations wherein the second receiver permutation controller executes the one or more predetermined collector permutations within a predetermined collecting interval; and the second receiver permutation controller further having, a collector counter to indicate the end of the collecting interval; the second collector having a sixth memory array into which the output vectors available from the fifth memory array are repeatedly written according to a predetermined collector permutation by the second receiver permutation controller being the inverse of the second predetermined distributor permutation used by the first permutation controller; and the second receiver permutation controller making available from the sixth memory array, according to a third predetermined collector permutation by the second receiver permutation controller being the inverse of the first predetermined distributor permutation used by the first permutation controller to repeatedly make available representations of the input payload of sampled signals as streamed output payload signals to the sink.

In a further aspect of the system, each memory array comprises two or more memory locations; and wherein each of the first transmitter permutation controller and the second receiver permutation controller further comprise: a distributor clock having a distributor clock rate fp according to the predetermined distributing interval; and further wherein each of the second permutation controller and the first receiver permutation controller further comprise: a decoder clock having a decoder clock rate fd according to the predetermined decoding interval according to the relationship fd=(S*L)/P*SF)*fp wherein:

L=length of the encoding code of all of the code sets;
S=quantity of input samples to be distributed within the distributing interval and also the quantity of memory locations in each memory array that is available to be occupied by input or output samples formed as one or more input or output vectors;
P=the quantity of electromagnetic propagation pathways
SF=the quantity of memory locations in each memory array allocated to store an input vector and an output vector, wherein for each input vector and each output vector SF is less than or equal to N where N is equal to quantity of memory locations of an input vector or an output vector of samples and each of the first, second, third, fourth, fifth and sixth memory arrays have at least N*P memory locations for input and output samples.

In an aspect there is a transmitter for communicating an input payload received from a source, the input payload comprising a stream of sampled signals for communication over one or more electromagnetic propagation pathways. The transmitter comprises a transmitter permutation controller having a memory for storing distributor permutations and the quantity of electromagnetic propagation pathways, and a control arrangement for executing one or more predetermined distributor permutations one of which is for distributing a predetermined quantity of input payload sampled signals into a predetermined quantity of input vectors, wherein the transmitter permutation controller executes one or more predetermined distributor permutations within a first clock domain and also executes at least one predetermined distributor permutation within a second clock domain. The transmitter permutation controller also having a first counter to indicate the boundary of the first clock domain, and a second counter to indicate the boundary of the second clock domain.

In an aspect of the transmitter there is a first distributor arrangement having a first memory array into which a predetermined quantity of the input payload is repeatedly written and stored according to a first predetermined distributor permutation to create as many input vectors as there are electromagnetic propagation pathways; a second memory array into which each input vector available from the first memory array are repeatedly written and stored according to a second predetermined distributor permutation when the first counter indicates the boundary of the first clock domain. The transmitter further comprising a second distributor arrangement having a third memory array into which each input vector available from the second memory array are repeatedly written and stored according to a third predetermined distributor permutation when the second counter indicates the boundary of the second clock domain; one or more encoders for repeatedly encoding input vectors within a predetermined encoding interval; there being as many encoders as electromagnetic propagation pathways, each encoder receiving a respective input vector, the encoding of the input vector being with reference to a predetermined encoding code set for each encoder, wherein each encoding code is a unique indexed sequence of chips and each of the encoding codes is orthogonal to each other encoding code and DC balanced with respect to all encoding codes in the predetermined encoding code set; each encoder output being an ordered series of output levels and each encoder making available each encoded ordered series of output levels for communication over a respective electromagnetic propagation pathway.

In an aspect there is a receiver for receiving an ordered series of output levels received from one or more electromagnetic propagation pathways. The receiver comprises: a sampler for each electromagnetic propagation pathway for transforming the ordered series of received output levels into decoded levels; one or more decoders for repeatedly decoding and using one each of the decoders for each electromagnetic propagation pathway wherein within a predetermined second receiver clock domain derived from the timing of the ordered series of levels, each decoder decodes encoded levels provided by the sampler associated with a respective electromagnetic propagation pathway, each decoding being with reference to a predetermined decoding code set for each decoder, wherein each decoding code set is the inverse of the corresponding predetermined encoding code set, wherein the output of each of the decoders is an ordered series of decoded output samples.

In an aspect of the receiver there is a receiver permutation controller comprising: a memory for storing collector permutations and the quantity of electromagnetic propagation pathways, and a control arrangement for executing one or more predetermined collector permutations one of which is for collecting a predetermined quantity of decoded output samples into a predetermined quantity of receiver input vectors, wherein the receiver permutation controller executes at least one or more predetermined controller permutations within the receiver second clock domain and also executes at least one predetermined distributor permutation within a receiver first clock domain; a first receiver counter to indicate the boundary of the first receiver clock domain; and a second receiver counter to indicate the boundary of the second receiver clock domain; a first collector arrangement having a fourth memory array into which are repeatedly written and stored one or more receiver input vectors according to a first predetermined collector permutation, a fifth memory array into which the receiver input vectors available from the fourth memory array are repeatedly written and stored according to a second predetermined collector permutation, when the first receiver counter indicates the boundary of the first receiver clock domain.

In an aspect of the receiver there is a second collector arrangement having a sixth memory array into which the receiver input vectors available from the fifth memory array are repeatedly written and stored according to a third predetermined collector permutation, when the second receiver counter indicates the boundary of the second receiver clock domain to repeatedly make available representations of the input payload of sampled signals as streamed output payload signals to the sink.

In an aspect, permutation controllers are adapted to change one or more of the predetermined distributor permutations.

Those of skill in the art would understand that information and signals may be represented using any of a variety of technologies and techniques. For example, data, instructions, commands, information, signals, bits, samples, and symbols may be referenced throughout this disclosure may be represented by voltages, currents, electromagnetic waves, magnetic fields or particles, optical fields or particles, or any combination thereof.

Those of skill in the art would further appreciate that the various illustrative logical blocks, modules, circuits, and algorithmic steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the application and design constraints imposed on the overall system. Skilled artisans may implement the described functionality in varying ways for each application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of both hardware and software. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein as programmatic steps, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by a computing device from another computing device. For example, a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device.

In one form the invention may comprise a media signal communication product for performing the method or operations presented herein. For example, such a media signal communication product may comprise a camera, video processor, or display, any of which might contain a stored-program computer (or information processor) capable of performing the operations described herein.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, indexing (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The terms "indicates", "indicating", and "indication" encompass a variety of actions and they can including but not limited to the generation of a signal (analog or digital), the setting of a bit to a predetermined value, the setting of a flag to a predetermined value, the change of a value, bit or flag, the generation of an interrupt signal to an integrated circuit or central processing unit.

The system may be a computer implemented system consisting of a video signal capture device at the source, a display device at the sink, an additional processor or processors and associated memory. The memory may comprise instructions to cause a processor or each processor selectively to execute one or more of the methods described herein. In some embodiments, the processor memory and display device may be included in a standard computing device, such as a desktop computer, a portable computing device such as a laptop computer or tablet, or they may be included in a customised video capture device or system at the source location or a video display device at the sink location. The computing device may be a monolithic computing or programmable device, or a distributed system comprising several components operatively (or functionally) connected via wired or wireless connections and may be assembled from independently manufactured devices. An embodiment of a computing device comprises a central processing unit (CPU), a memory, may include a display apparatus, and may also include an input device such as keyboard, mouse, etc. The CPU comprises an Input/Output Interface, an Arithmetic and Logic Unit (ALU) and a Control Unit and Program Counter element, which is in communication with input and output devices (e.g. sensor arrays acting as an input device and or photon emitters acting as a display apparatus for human or machine viewing) using a suitable the Input/Output Interface. The Input/Output Interface may comprise a network interface and/or communications module for communicating with an equivalent communications module in another device using a predefined video and associated signalling (downstream and upstream) communications protocol. The terms downstream and upstream is a term of art and the term stream relates to the flow of at least an ordered sequence of samples representative of the video signal. The system and computer implemented system at the source can be directly associated with an optical sensor and at the sink can be directly associated with a visual display device. There are various arrangements where the computer implemented system or parts thereof are executed separately from the optical sensor or visual display device and may in some cases be located externally of a source arrangement such as a camera and external of a sink arrangement such as a display device. Various up-hill and down-hill control and feedback paths may be provided over and above the video payload signalling path(s) using separate path(s) or sharing the same path(s) as the payload.

The computing device may comprise a single CPU (core) or multiple CPU's (multiple core), or multiple processors embedded in an System-on-Chip (SoC), Application-Specific Standard Protocol (ASSP), Application Specific Integrated Circuit (ASIC) or variants thereof which can be digital and analog. The computing device may incorporate a parallel processor, a vector processor, one or more virtual processors or be a distributed computing device. A memory array is operatively coupled to the processor(s) and other circuits may comprise RAM or ROM components or both, and may be provided within or external to the device. The memory may be used for transitory and non-transitory storage of the operating system and additional software modules or instructions, algorithms and copies of code sets and permutations and algorithms for changing a predetermined permutation and the manner and timing of the change, and as well the seed for generating a permutation where a seed is random array of values that specifies the start point of a process to generate a pseudo-random sequence of values and in particular for generating a permutation to be stored in the memory and thus an array of values for that use. The processor(s) may be configured to load and execute the operating system and additional software modules or instructions, algorithms and copies of code sets and permutations and algorithms for changing a predetermined permutation and the manner and timing of the change, and as well the seed.

BRIEF DESCRIPTION OF FIGURES

FIG. 4A depicts a block diagram of a source and a generic transmitter arrangement for receiving a media signal from the source;

FIG. 4C provides a table enumerating the relationships among the parameter values for the embodiment shown in FIG. 4B, providing an example for 8K video transmitted over 4 EM pathways;

FIG. 12B provides a table enumerating the relationships among the parameter values for the embodiment shown in FIG. 12A, providing an example for 8K video received over 4 EM pathways;

DEFINITIONS

Figure 1:
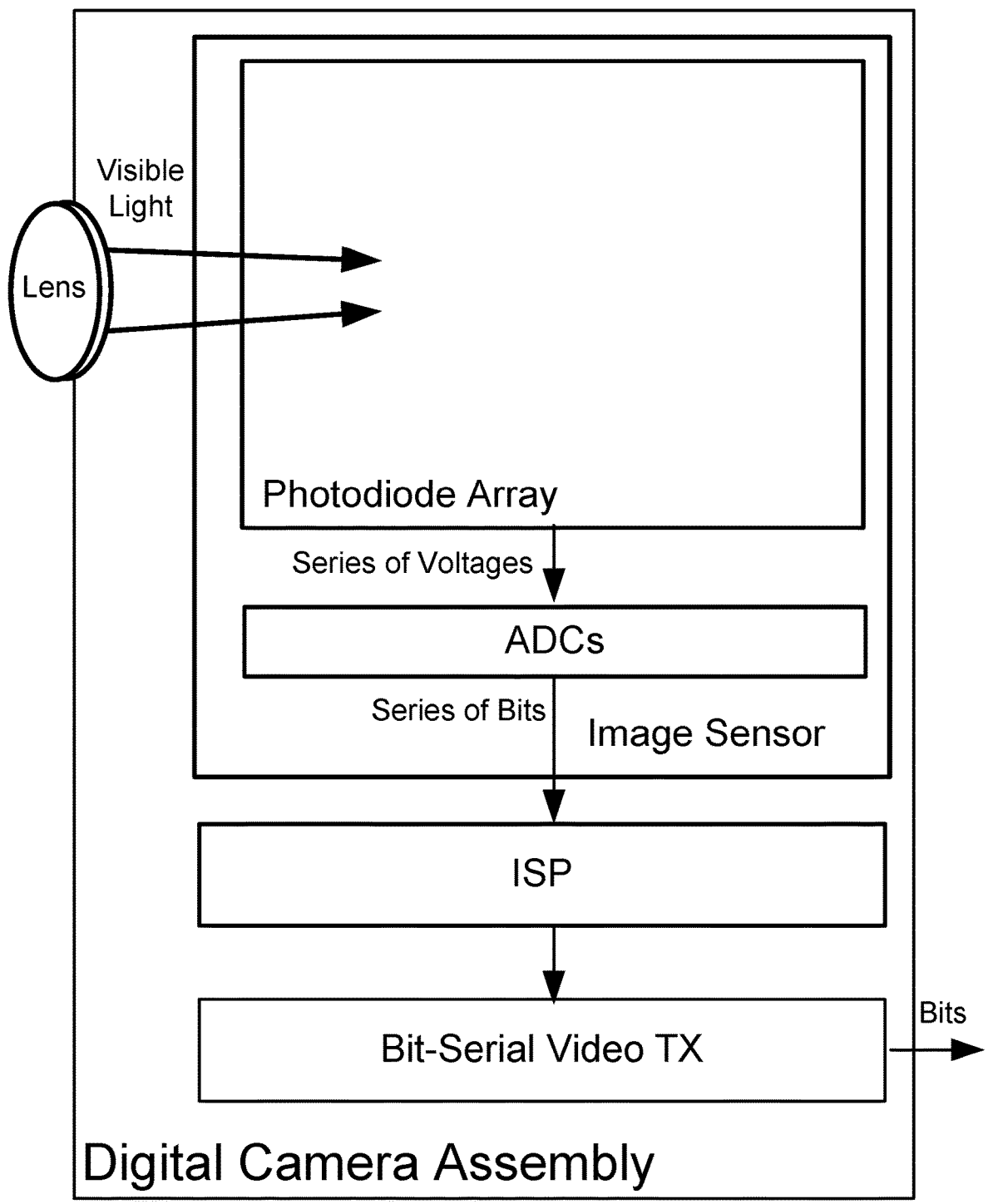
FIG. 1 depicts a block diagram of a digital camera source assembly providing a bit serial output.

The following terms and phrases have the meanings indicated below, unless otherwise provided herein. This disclosure may employ other terms and phrases not expressly defined herein. Such other terms and phrases shall have the meanings that they would possess within the context of this disclosure to those of ordinary skill in the art. In some instances, a term or phrase may be defined in the singular or plural. In such instances, it is understood that any term in the singular may include its plural counterpart and vice versa, unless expressly indicated to the contrary.

As used herein, the singular forms "a," "an," and "the" include plural referents unless the context clearly dictates otherwise. For example, reference to "a substituent" encompasses a single substituent as well as two or more substituents, and the like.

As used herein, "for example," "for instance," "such as," or "including" are meant to introduce examples that further clarify more general subject matter. Unless otherwise expressly indicated, such examples are provided only as an aid for understanding embodiments illustrated in the present disclosure and are not meant to be limiting in any fashion. Nor do these phrases indicate any kind of preference for the disclosed embodiment.

Terms relating to the widely understood Spread Spectrum transmission system are defined and elaborated upon in "*Spread Spectrum Systems with Commercial Applications*" by Robert C. Dixon, volume 3, Wiley & Sons 1994.

EM Signal A sequence of quantities measurable as electromagnetic (EM) energy.

EM Path An electromagnetic (EM) propagation pathway and its environment, through which electromagnetic energy is conveyed between terminals. Every EM path is an imperfect medium, because EM signal levels measured at a receiver terminal do not necessarily equal the EM signal levels made available to the EM path at a corresponding transmitter terminal.

Waveguide An EM path that physically constrains and confines the EM signal propagation vectors.

Visual Perception A person's subjective awareness, comprehension, or understanding of an EM signal whose wavelength lies in the visible spectrum.

Media Signal Sampled signal destined for visual perception via some sink device.

Media Transport A method or apparatus for communicating one or more media signals over a single EM path.

Source equipment Located at the uphill side of one or more EM propagation pathways, with respect to the direction of media communication and sub-channels; for supplying a media signal as an ordered sequence of sampled signals eventually for input to the one or more EM propagation pathways, sometimes referred to as a source.

Sink equipment Located at the downhill side of one or more EM propagation pathways, with respect to the direction of media communication; for eventually receiving a media signal as an ordered sequence of sampled signals from the one or more EM propagation pathways, sometimes referred to as a sink.

Media Interface A specification with respect to source and sink equipment for communicating set or collections of media signals as EM signals; implemented with one or more instances of a media transport, plus provisions for bi-directional communication of control, signalling and status information. The media interface also specifies requirements for mechanical/electrical/logical characteristics of the connectors connecting source and sink equipment to the EM path, as well as requirements for the EM path itself.

Tunnelling The technique of conveying modest-volume, must-be-bit-accurate digital signals through the same EM path used by a media transport by transporting this collection of digital signals as a bit-serial signal directly modulated with a spreading code that is orthogonal to each of the codes in the preferred media transport code book and to any other codes active in the EM propagation pathway.

Colour Space An abstract mathematical model, which describes a colour gamut as tuples of numbers, typically as 2 or 3 components per pixel (examples include RGB, YUV, YCbCr, and CMYK).

Colour Value A signal amplitude corresponding to a basis vector in a color space.

Pixel A mathematical object associated with a geometric location in a 2D region, such as an image frame; a pixel is completely described as a set of Color Values, equivalently, a vector in a color space of a picture element.

Image A 2-dimensional array of pixels.

Video A sequence of Images displayed at a predetermined frame rate which induces perception of motion and continuity in human viewers.

"Analog" EM Signal Any sequence of measurable electromagnetic energy. Physical quantities change continuously over time, and the number of different amplitudes available is limited by our ability to measure energy. Examples of analog signals.

Image sensor pixel light measurement At each "pixel" in the sensor, pre-charge a capacitor to a known voltage, then conditionally discharge the capacitor through a photodiode during a predetermined exposure interval; the brighter that portion of the focal area, the greater the number of photons traversing the photodiode, the greater the current in the photodiode, the lower the voltage on the capacitor after the exposure interval.

Image display pixel brightness control current The brightness of each "pixel" in the display (the smallest controllable portion) is determined by a control current at any given moment.

Digital Signal An analog signal constrained such that the values are expressed with predetermined arithmetic precision, and the values change at predetermined intervals. Examples of digital representations of a signal include: An R or G or B entry in a TIF file.

P Number of EM paths connecting source to sink and also used as the number of other things such as memory arrays and sets of values.

S Number of input sampled signals from the payload distributed to the transmitter per pixel-clock (input sampled signals can be analog or digital).

SF Number of memory locations in each memory array allocated to store valid video samples in an input vector and an output vector, also referred to as Samples Filled being the number of valid sampled signals in a memory array (also referred to herein as a Bank) where SF<=N.

N Number of elements in an encoder input vector and the corresponding decoder output vector. N can be any counting (integer) number.

Input Vector A finite, ordered series of samples collected from input media signal. The input vector comprises N values.

Output Vector A finite, ordered series of samples provided by a decoder and collected to reconstruct media signals. The output vector comprises N values.

Bank A memory array into which is accumulated and read from, one or more input or output vectors of N*P samples; a Bank having memory locations for all the sets of N*P samples.

L The length of the encoding code of all of the code sets, also the common number of Chips in each code, equivalently, the number of chips applied during each encoding interval or decoding interval. When L is larger than N, more electrical resilience is afforded to the conveyed information signal which is the result of process gain.

Chip A value from a predetermined, bounded but not necessarily finite, set of possible values, that is one of the sequence of values making up a Code, in a common embodiment a chip value can be either −1 or 1, however, there is a broader range of possibilities.

Code A predetermined sequence of Chips. In this disclosure, L is the variable that represents the length of a code in Chips. In an aspect, the statistical/frequency characteristics of Codes are relevant to an embodiment of the media signal transport disclosed herein.

Code Book A collection of codes. A Code Book is considered orthogonal if all of its N codes are pairwise uncorrelated and independent sequences. (An orthogonal Code Book minimizes multiple access interference among the N codes therein.)

Binary Code Book A Code book wherein the chips are binary, taking one of two values wherein the two values are normalised to −1 and 1.

Permutation The action of changing the arrangement, especially the linear order, of a set of items. A predetermined permutation changes in a predetermined manner the linear order of a finite, ordered series of samples or values.

PN Sequence A Code whose output exhibits spectral characteristics similar to those of white noise. "PN" stands for "Pseudorandom Noise." An ideal PN Sequence's signal energy is uniform across the transmission spectrum, wherein A PN signal contains a number of frequency components appearing as the teeth in a fine-tooth comb underneath a sinc^2 envelope in the frequency domain with equal energy at every frequency. (NB: Not all Codes are PN Sequences.)

Spreading A property of individual Codes, and the effect of modulating a signal by a PN Sequence, A signal modulated by an ideal PN Sequence exhibits spectral characteristics similar to those of white noise.

Spreading Code PN Sequence whose chip run length distribution statistics confer properties suitable for communication. (see, for example: Dixon Table 3.1) (NB: Not all PN Sequences "spread" ideally)

Spreading Ratio
=The number of successive Chips modulating each input sample
=The number of successive Chips demodulating the ordered series of received values to decode the output vector
=Spreading Factor (Dixon uses the terms "Spreading Ratio" and "Spreading Factor" interchangeably)
=SSDS process gain
=Code length
=Chip sequence length
=The number of encoder Chips modulating each sample in the input vector
=The number of decoder Chip correlations contributing to each sample in the output vector Orthogonality A property of sets of Codes ("Code Books").

DC Balanced Binary Code A Binary Code containing an equal number of each of 2 possible chip values.

DC balanced Binary Code Book A property of a code set and in a preferred embodiment, each of these codes in the code set is a binary value, either +1 or −1, and each code in the set is DC-balanced. It is possible to only use a designated portion of a code book matrix which has the above property.

Distributing Interval A period allocated for initializing the Input Vector with SF samples collected from input media signals and during which S input samples per clock cycle from the payload are distributed to the transmitter. A period for initializing the P Input Vectors with SF samples, delivered S per input cycle from the input payload.

Encoding Interval A period allocated for modulating one or more (P) sets of N Input Vector samples by the L chips per code set.

Decoding Interval A period allocated for demodulating one ordered series of values received from the EM path by the N L-chip Codes per Code Book to reconstruct N Output Vector samples.

Collecting Interval A period for assigning SF Output Vector samples from the P Output Vectors with SF samples, delivered S per output cycle to the output payload.

DETAILED DESCRIPTION OF EMBODIMENTS

In a video system the transformation of the incident light into a signal is performed by a source assembly or a Graphics Processing Unit (GPU) and a predetermined transformation will determine the format of the payload that is to be transported from the source assembly, over one or more electromagnetic pathways, to a sink assembly, which could be a display or a video processor, which receives the predetermined format and transforms the received payload into a signal used with a suitable output device for creating radiated light suitable for viewing by humans.

Sampled signals, in particular media signals, by way of example only, a video camera output or even a visible light sensor device output, can be provided in analog or digital form regardless of whether the source signals are line-orientated, block-orientated or frame orientated. Whether there is preferred use of an Analog to Digital transformation or the raw time sampled voltage or current sampled signal is used as the payload to be conveyed, will largely depend on whether the methods and apparatus disclosed herein are adapted to receive those particular types of media signal. Analog and digital embodiments are disclosed.

Inherent in the transformation of raw media signals is the need to use a predetermined colour space to represent the raw time sampled voltage or current value as a colour within that colour space.

So further by way of example only for illustration purposes, an ordered sequence of samples is received as a formatted bit serial ordered sequence of Red, Blue and Green (R, G, B) sample values for each picture element (pixel) as determined by a predetermined transformation of the light energy detected by a source video sensor device 100 as depicted in FIG. 1 (prior art). The details of how the incoming light is transformed into a formatted bit serial ordered sequence of output values is not the subject of this disclosure. Thus, given a set of S video signals delivered across electromagnetic propagation pathway(s), there are methods and means described herein to reconstruct those S video signals at the opposite end of a set of P EM Paths. However, for the purposes of illustration, the Red value, the Green value and the Blue value of each pixel in a corresponding row of pixels which is one row of a frame of such pixels is provided as if the frame of pixels is output by device 100 in a serial manner as is also the next frame. The spatial location of each picture element is not part of the information communicated with each pixel. However, the location of sampled values representative of the pixel value in the input video signal is indicative of its location in a frame of such sampled values, so framing information is part of the sampled signal payload which may be conveyed separately from the S video signals and may be conveyed across the same or different electromagnetic propagation pathway(s).

Figure 2:
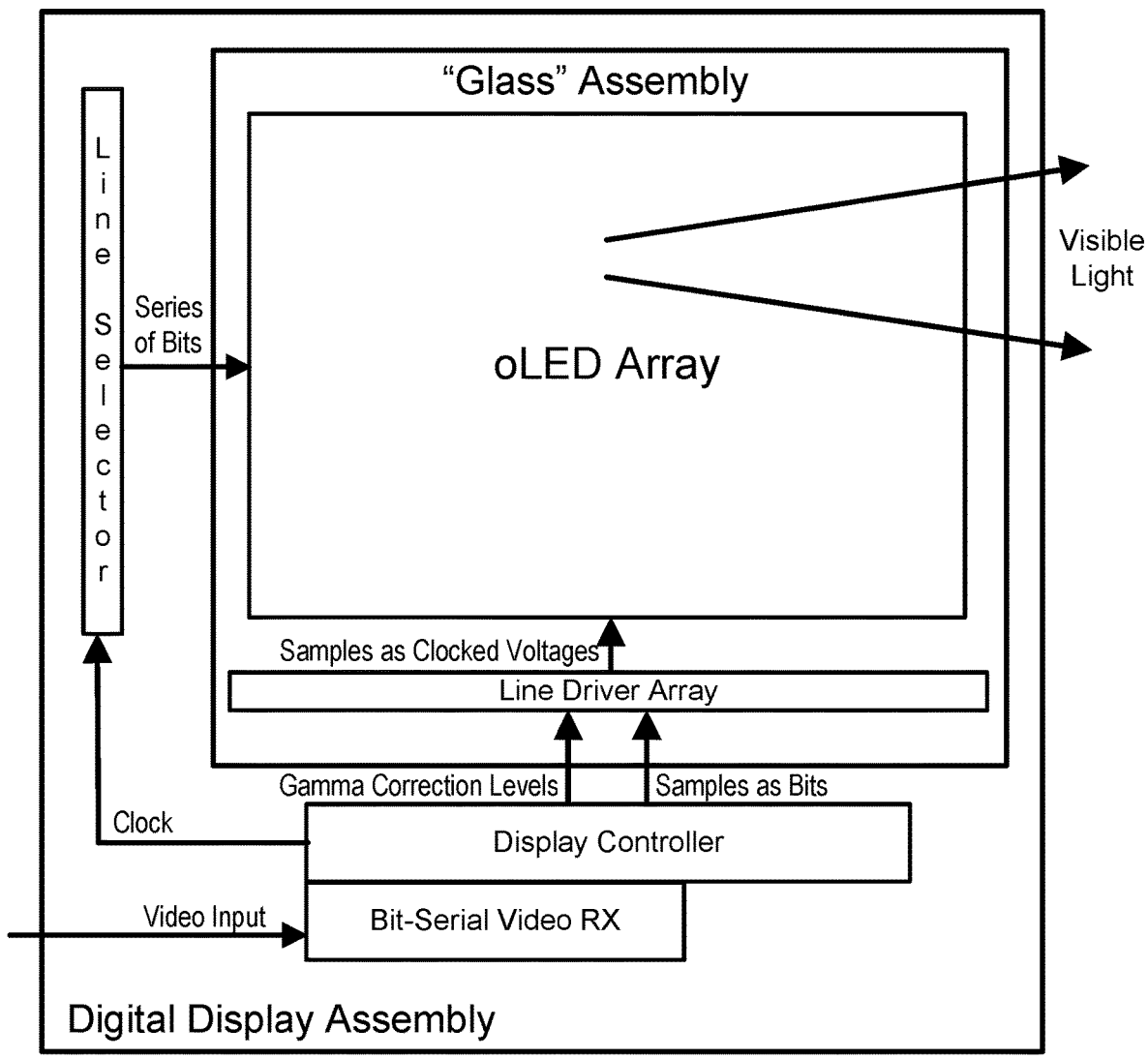
FIG. 2 depicts a block diagram of a sink assembly for receiving a bit serial input.
Figure 3:
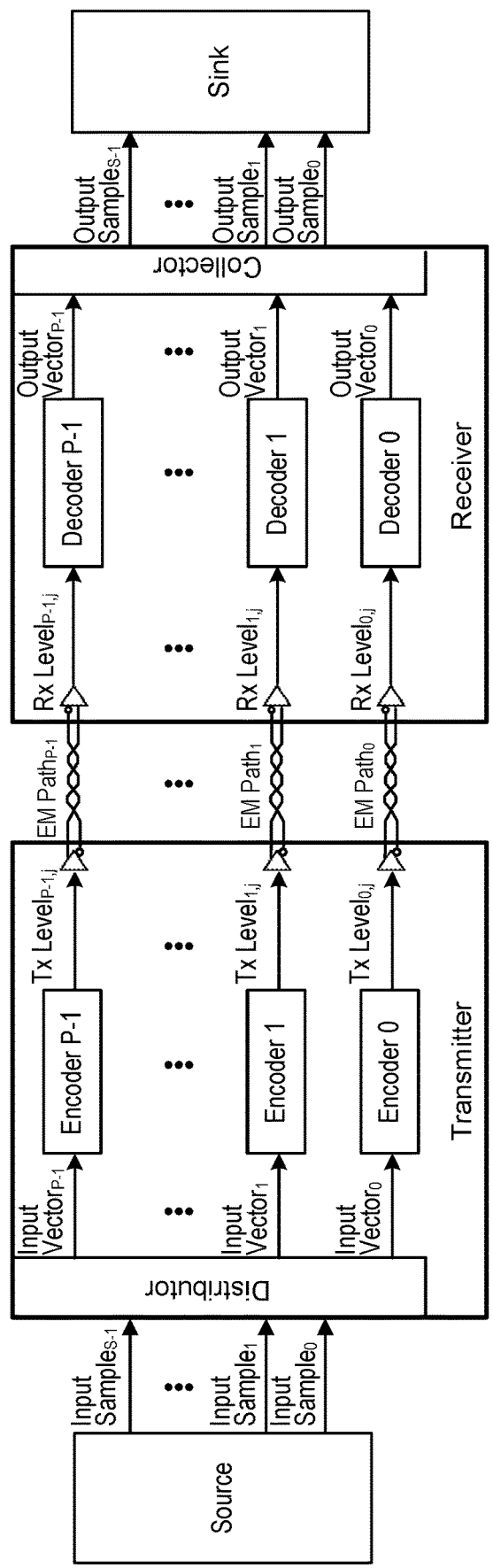
FIG. 3 depicts a block diagram of an embodiment of a source having payload signals provided to a first apparatus making available a permuted and encoded ordered series of output values for communication over one or more EM pathways to a second apparatus for decoding and reversing the prior permutations to make available reconstructed payload signals to a sink.

Assuming perfect transmission and reception of each of the bits of information of the bit serial ordered sequence of pixel values from a source, in this example a video sensor device, to a corresponding sink, by way of example a video display device 200 as depicted in FIG. 2, then the received ordered sequence of bit serial data (or sample values) of a particular format can be received and transformed in to visible light for viewing by a human as is depicted in FIG. 3 in the form of a block diagram of a source device, video signal conveyance and reception at a sink device. As known in the art, the line driver array includes DACs.

As mentioned there will be additional information such as for example, the framing signal, Pan, Tilt and Zoom (PTZ) commands of a camera, and camera or other source control signals, and others, but for the purposes of this illustration those details can be dealt with within the payload or separately, sometimes using other signals and other channels, as is disclosed by way of embodiment in WO2017/049347 and WO2018/170546.

An unfiltered image sensor output represents the Luminance of the impinging photons and outputs those measurements serially row by row of a fixed number of rows which then represents a frame. However, most individual pixel sensors are covered with a filter; for each pixel there are at least three pixel sensors and three different filters, thereby causing each sample to represent a predetermined colour. A color (e.g., RGB) representation of each pixel is created in the video system outside of the image sensor through the process or interpolation, or de-mosaicing.

Raw formats output by most image sensors are larger in both dimensions than the target resolution, to facilitate de-mosaicing (interpolating) at the edges. Usually as many as 8 extra samples are taken on each edge, suggesting interpolation filter windows as large as 16×16. So as to provide some measure to the scale of the task of conveying the volume of sampled signals involved for a sensor that captures samples from some 8 million pixels, has a resolution of 3,264×2,448 pixels, thus there are 327,184 pixels in an area just 1 mm×1 mm in size, thus in every frame, and at 60 frames per second, there are almost 500 million pixels sample values in total needing to be conveyed per second.

Each of the methods and apparatus disclosed herein are oblivious as to what colour any given sampled value might represent, a challenge is collecting them and providing them for encoding prior to conveyance over one or more EM pathways.

In this document, the symbol P (being an integer value) is representative of the number of EM pathways connecting the source assembly to a sink assembly.

Yet further, the symbol S is representative in this document of the number of input and output signals which are representative of the reconstructed payload samples which have been made available serially for transport to the location of the sink assembly, and which are received by the sink assembly serially. As discussed above the format of the media signal payload will be part of the determination of this value, but the methods and apparatus disclosed are oblivious to that distinction.

WO2017/049347 discloses the making available from the source assembly of Red, Green and Blue (R, G, B) pixel values as derived from a sampled media signal source, thus S=3 (in the referenced documents this number is also referred to as S) even though the values of R, G, and B are only selected components of a single video signal, being in one example the visual portion of a HDMI interface signal that has other components. If the HDMI interface signal output is YCbCr422 colour space then S=2

WO2017/049347 also discloses the use of spread spectrum techniques using a direct sequence encoder with a predetermined Code Book, and modulating the encoded signal into a single EM pathway, thus P=1. At the other end of the single EM pathway, a direct sequence decoder using the same predetermined Code Book as previously mentioned decodes the signal received from the EM pathway and the output of the sink assembly comprises a reconstructed version of the payload received by the source assembly and thus the output signals are the reconstructed R, G, and B signals and thus S=3.

Thus WO2017/049347 discloses P=1 paths and S=3.

WO2018/170546 discloses P=3 paths and S=3 wherein it is taught that it is possible to transport the Input Payload over P different paths.

In both the WO2017/049347 and WO2018/170546 the type of media signal that is processed by way of example in those documents is a video signal comprising the R, G and B components of a HDMI signal. However, while some of the examples shown are for RGB full-colour images, the subject of those disclosures applies regardless of the depth/number of payload signals or colour space of any video in the payload, including all variants of chroma/luma separated (and chroma-sub-sampled) colour spaces (e.g., YUV, YUV 4:2:0, etc.), as well as Monochrome (i.e., just Y). However, P=S is still the case in those disclosures.

HDMI is one of many video interfaces, and is the media signal interface disclosed in working embodiments in both the WO2017/049347 and WO2018/170546 documents.

In short and in no way meant to change the meanings or scope of the terms used in the source documents, the methods disclosed in both the referenced patent documents, in an aspect, comprises taking an ordered sequence of input payload samples and repeating the following sequence of steps, potentially endlessly, of:
 a. distributing an Input Vector from the Input Payload samples;
 b. encoding the Input Vector into a Transmitted Signal under control of a Code Book;
 c. transporting the Signal, which involves two concurrent activities;
  i. Transmitting the Signal, and
  ii. Receiving the Signal;
 d. decoding the Received Signal into the Output Vector, under control of the Code Book; and
 e. collecting in the reverse of the distributed Output Vector into an ordered sequence of reconstructed Payload samples.

Both the WO2017/049347 and WO2018/170546 documents disclose the use of a permuter in the distribution process. The permuter assigns input payload samples to a location within an input vector. The permuter implements a pre-determined permutation.

WO2017/049347 teaches the use of a permuter located at the source (the uphill location) and is referred to as the collector. However, in WO2018/170546 the teaching is of the use of a permuter located at the source (the uphill location) but is referred to as the distributor. In both patent documents the respective interval for collecting and distributing are also referred to accordingly as the collecting interval and the distributing interval. This change of terminology between the referenced documents makes no difference to the respective functions and intervals as described in the respective documents. In any case and for the remainder of this specification the terminology of WO2018/170546 is used wherein the distributor is located at the source (uphill location) and the collector is located at the sink (downhill location) as depicted in FIG. 3.

FIG. 4A depicts a block diagram of a generic source device 490 providing an ordered sequence of sampled signals, wherein the ordered sequence of sampled signals 491 is a media signal representing analog sampled signals derived from a sensor of the source device. In an embodiment of an arrangement the sensor of a source device can be a Metal Oxide Silicon (MOS), CMOS, or CCD device which provides an ordered sequence of sampled signals. In an embodiment, where the sensor device is configured to provide video signals, the ordered sequence of sampled values needs to be accompanied by framing signals to define, at least the transitions from frame to frame of the media signal. Other sensor devices will have different accompanying signals and parameters but the sampled signals can still be received and processed in accordance with the disclosures in this document.

Alternatively, the ordered sequence of sampled signals is a media signal representing analog sampled signals created using a sampled signal formatting arrangement, so as to create a formatted signal in accordance with one of HDMI, DisplayPort, Digital Visual Interface and Serial Digital Interface standards.

Functional block 492 (dotted lines) is media signal receiver block used when the media signal is of the formatted type to convert the formatted signal into an ordered sequence of sampled signals, such as for example, R, G, B values of successive pixels and the extraction of the framing signal, determination of the order of the pixels (for example: top left to bottom right of the frame), and other signals such as audio and others which are part of the respective standard. One of the outputs of functional block 492 is an ordered sequence of sampled signals which are the signals processed in the manner described herein.

Functional block 493 is a first apparatus for distributing the ordered sequence of sampled signals into input vectors, there being as many input vectors as there are electromagnetic propagation pathways 495. There is one distributor within the functional block 493 to provide those input vectors to corresponding encoders, within functional block 494 as described and which makes encoded signals available for modulation onto a respective number of electromagnetic propagation pathways per encoder.

Figure 4B:
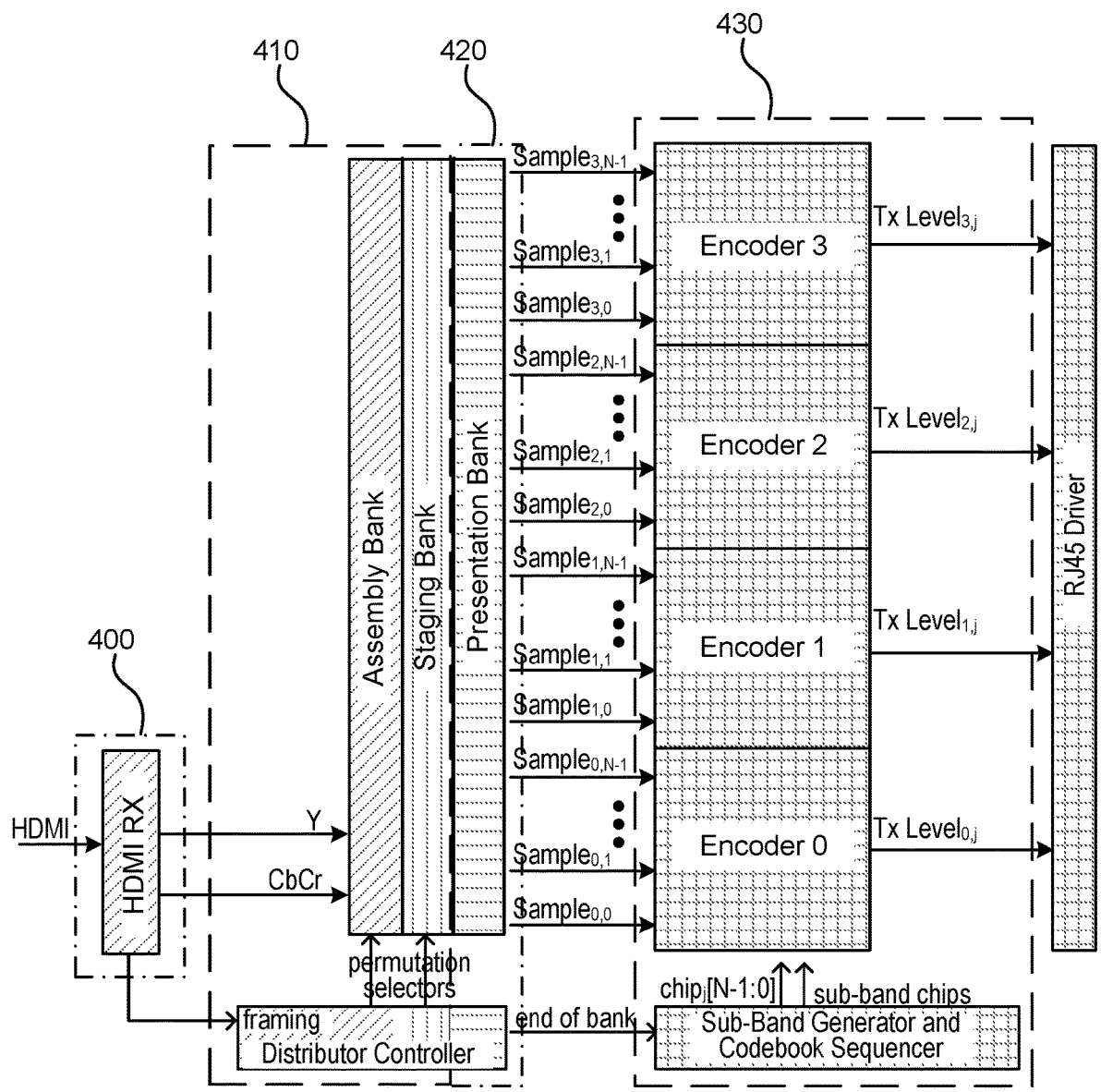
FIG. 4B depicts a block diagram of an embodiment of a transmitter arrangement for receiving a media signal from a source.

FIG. 4B is block diagram of a transmitter arrangement which receives a media signal from a source shown in this Figure as an HDMI standard signal but could in other embodiments raw sensor sampled output, and following processing with the transmitter arrangement to make available the output of the transmitter into a RJ45 connector, by way of example, into four electromagnetic propagation pathways, in an embodiment, four of the Unshielded Twisted Pairs (UTP) of a single cable. The use of an RJ45 connector is an example only of a mechanical interface to an electromagnetic propagation pathway, the physical interface will vary depending on the technical specification of the encoder output, and the physical interface requirement dictated by the type of electromagnetic propagation pathway.

The transmitter arrangement comprises a media signal receiver block 400 adapted for receiving a representation of a set of media signals in some standard format and provides S input signals to a first distributor block 410 which includes a first transmitter permutation controller and a first distributor, the distributor having at least one memory array referred to herein at times as a bank of memory (bank). The first transmitter permutation controller, as will be described in greater detail later in the specification, is adapted to execute at least one predetermined distributor permutation to permute sampled signals into one or more input vectors for storage in the memory array in this embodiment into an assembly bank and a staging bank. A second distributor block 420 includes a second transmitter permutation controller having at least one memory array referred to as the presentation bank is adapted to receive the one or more permuted input vectors from the memory array of the first distributor block 410. The second transmitter permutation controller performs at least one predetermined permutation to permute input vectors in the storage array associated (the presentation bank) with the second distributor into the one or more encoders referred to as the encoder block 430, there being an input vector per encoder. The encoded input vectors are made available and modulated as signals suitable for transmission over an electromagnetic propagation pathway, for example, respective RJ45 connector wires.

In a general form, the first distributor block 410 receives and distributes, within a predetermined distribution interval, the input payload (for the purposes of this description the payload is a digital video signal, but the payload may comprise sample values (such as a representation of a voltage or current)). The input payload comprises a set of video signals, each being an ordered sequence of samples wherein the video media source device determines the rate (for example, bits per second, or samples per second) at which each pixel value (which in a digital representation has a bit depth commensurate with the video signal standard being used) is provided from the source device. That is, an input sample is accepted by the media signal receiver block 400 every cycle of the clock (pixel_clk) used by the source as depicted in FIG. 4B as the colour of media signal receiver block 400 and of the assembly bank, and in FIG. 5 as the colour of block 500 (denoted pix).

Figure 5:
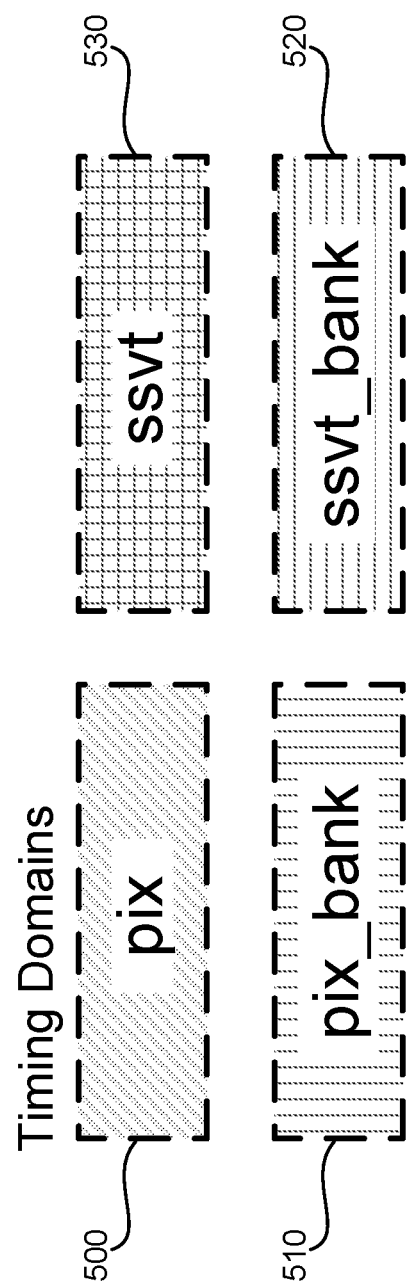
FIG. 5 depicts the colour coding used to identify the various timing domains of operation in the embodiments of transmitter and receiver apparatus.

Within the first distributor block 410 the pixel_bank (denoted pix_bank) timing domain is used as depicted in FIG. 4B by the colour of the staging bank in first distributor block 410 and in FIG. 5 as the colour of block 510 (denoted pix_bank). In embodiments to be described, the source timing domain (denoted pix) and the pix_bank timing domain are based upon the same clock (sometimes also referred to as the pixel_clk). The term bank refers to the memory array associated with respective first and second distributors. Each memory array can be implemented as one or more banks of memory allocation, each bank being used to temporarily store input vectors. Likewise, within the second distributor block 420 the second transmitter permutation controller has a timing domain referred to herein as the ssvt_bank timing domain and sometimes used as in the form ssvt_bank_clk. The use of the term 'ssvt' in this document is merely a identifier to that portion of the arrangement disclosed in this document which relates to encoding and decoding using Spread Spectrum techniques. That timing domain is used as depicted in FIG. 4B by the colour of second distributor block 420 and in FIG. 5 as the colour of block 520 (denoted ssvt_bank). Further, within the one or more encoders referred to as the encoder block 430 there is a timing domain referred to herein as the SSVT timing domain and sometimes used as in the form ssvt_clk. That timing domain is used as depicted in FIG. 4B by the colour of the encoder block 430 and in FIG. 5 as the colour of block 530 (denoted ssvt).

The first and second distributors control, using a predetermined permutation, the transfer and location of each sampled signal of the incoming payload into a respective bank to form P input vectors of length N. The use of the term input vector is not meant to imply that each of the sample vectors represent any particular geometric characteristic. The term merely defines the existence of a set of N samples which happen to be serially associated with each other as they have been sourced from a video signal which has been supplied as a stream of ordered sample values or alternatively digital pixel values.

Greater L (at fixed N) in principle confers greater electrical resilience, although the consequences of roll off at higher frequencies cannot be ignored. Greater N (at fixed L) reduces f_ssvt_clk but requires larger circuit area in a semiconductor embodiment and more bits of resolution in the analog channel. Thus, f_ssvt_clk is proportional to L/N.

FIG. 4C is a table containing the relationship between the various timing domains used within the transmitter. For illustrative purposes an 8K60YCbCr 20 bpp where P=4, N=64, L=128, S=2 and SW=10. The table is an array having the four different timing domains that can exist within the transmitter pix; pix_bank; ssvt_bank; and ssvt and the rows refer to the number of signals (#Signals); the Sample Width (SW) and the Update Rate (in GHz).

"SW" is "SAMPLE_WIDTH" referring to the number of bits in each (digital) input sample.

Note that SAMPLES_FILL (SF) can be lower than N, meaning that the permutation controller will fill the input vectors only with SAMPLES_FILL valid meaningful samples each, instead of the full complement of N. This derives a fixed ratio between ssvt_clk and pixel_clk frequencies for a synchronous design: fssvt_clk=(S*L)/(P*SF)*fpixel_clk. An asynchronous design will use a different ratio as described below.

In an example, a 1080p60 HDMI payload via N=L=64, R=S=3, W=P=4 using the disclosed transport arrangement. N samples are conveyed concurrently during each encoding/decoding interval, in each encoder/decoder. N*W=256 samples are conveyed concurrently. One "bank" of size 256 samples is written/read to/from a distributor/collector buffer at the beginning of each encoding/decoding interval. In which case in this embodiment there are the following Distributor/Collector Design Considerations. The payload of one 1080p scanline=1920*3 equalling 5760 samples. Each scanline includes 280 clock cycles wherein data_enable is not asserted (the horizontal retrace interval), so each scanline interval is 2200 clock intervals. Thus, the desirable size of one scanline buffer is an integer multiple of the bank size. In those (most likely) cases wherein the number of samples in a scanline is not an integer multiple of the bank size, some "nonsense" samples will be conveyed. There is no application-level jeopardy from this occurrence, because data_enable is not asserted at the times when reconstructed "nonsense" samples are presented at a distributor output. However, if the intervals are not ideally related, and if the modulation interval cannot be squeezed or stretched (such as when the electromagnetic propagation pathway is over UTP it has been demonstrated to be "faster" than HDMI), then the size of the buffer needs to accommodate a worst-cast phase relationship.

On the other hand, it is possible to convey one or more related input vectors at its intrinsic rate and continue to convey "nonsense" samples after having run off the end of the input vector (where there is a Sample Full condition for each bank holding a respective vector, but there are still slots in the bank to fill), so long as the corresponding reconstructed samples are presented to the collector output during a determined time interval wherein they have no deleterious impact on the output signal values. HDMI receivers, for example, ignore spurious RGB data received during the horizontal retrace interval.

Thus in an embodiment, rates can be matched by the distributor and collector both running a pair of concurrent processes, each of which operates on a pair of respective number of input vector buffers (one or more banks):

native transport writes/reads to/from distributor/collector one buffer at the rate mandated for the native transport; and encoders/decoders read/write from/to the other distributor/collector buffer at the modulating/demodulating rate.

The transport arrangements disclosed herein are able to reconstruct one frame within a native transport video frame interval in order to sustain the associated frame rate. Therefore, the time available for catching up a slower transport frame conveyance to a faster native transport arrangement equals the sum of time allocated during one frame interval to the horizontal and vertical retrace intervals. That interval also equals the number of "spare" locations per frame (each bearing N samples) times the distributor/collector input/output interval.

When an embodiment of the transport mechanism can be faster than the native transport mechanism, that is when the transport mechanism can convey a frame more quickly than a native transport, for a variety of reasons:

W>R,P>S

This could be a common product occurrence, such as for HDMI over UTP

The modulating/demodulating rate>native transport sample I/O rate higher speeds are more readily achievable for simple circuits higher modulating rate confers greater spreading ratio It would be a conventional approach to match rates by applying back-pressure to the disclosed transport mechanism. However, the timing acquisition and tracking aspect of the disclosed transport is optimised for continual, free-running operation. Therefore, it is not preferable in that circumstance to stall modulation/demodulation in any implementation that will form the basis for a device using the disclosed mechanism.

Each permuted input vector is made available to a respective encoder in encoder block 430 for encoding, within a predetermined encoder interval. Within each encoder a respective input vector is encoded into an encoded signal under control of a code book (choice of codes and the length L of the code is not the subject of this specification but can be determined from the two referenced patent documents). An improvement upon Spread Spectrum Direct Sequence—Code Division Multiple Access (SSDS-CDMA) transmission is used to encode the presented input vector. A Code is a unique indexed sequence of L chips, and each of the codes is different from the other N−1 codes in the set. In a preferred embodiment, each of these chips is a binary value, either +1 or −1, and each Code is DC-balanced. Each Code in the Code book is associated with a unique position in the input vector. In one class of embodiments, the possible chip values are −1 and +1, the binary values so chosen to facilitate DC-balanced direct sequence modulation by a Code. An encoded signal from each encoder is provided to a respective electromagnetic propagation pathway.

In a general form, the ssvt_bank timing domain used in block 420 is different from the ssvt timing domain (the relationship between their update rates is given by: f_ssvt_bank=f_ssvt_clk/L). For the second permutation controller and encoder the ssvt timing domain is used within block 430 of FIG. 4B. In general, a clock signal regulates the operation of a collection of synchronous circuits which together make up an "X timing domain." The clock signal is usually denoted X_clk for clarity. "f_X" is a notation for the frequency of the clock signal. For example, considering the ssvt and ssvt_bank timing domains, we have from above: f_ssvt_bank=f_ssvt_clk/L. Thus, a clock signal for ssvt_bank may be derived from ssvt_clk, and similarly, a clock signal for pix_bank may be derived from pix_clk.

Thus, in one general form the distributing interval can be the same as the encoding interval but they can also be different. In a general form the first transmitter permutation controller has a first distributor counter to indicate the boundary of the distributing interval and the second transmitter permutation controller has an encoder clock counter to indicate the boundary of the encoding interval. In an embodiment of the system the f_ssvt_bank=f_ssvt_clk/L and the Encoding/Decoding interval=f_ssvt_clk/L. In another embodiment the Distributing interval would not equal the Encoding interval if the memory Banks were created/consumed by separate processes, communicating via storage. However, in a primary arrangement which involves continually repeating the process, for timing acquisition and tracking, the intervals desirably match during any one predetermined series of sample values, such as for example, within a frame.

The permutation controller at the source end and permutation controller at the sink end are adapted to change one or more of the predetermined (as at the time or execution) distributor permutations and the respective predetermined (as at the time or execution) collector permutations at the boundary of a respective distributing and at the boundary of a respective collecting interval.

In a general form at the sink end of the electromagnetic propagation pathway(s) there is a receiving apparatus, which is adapted to demodulate the signal received from the electromagnetic propagation pathway so as to receive the sequence of levels, decode them and then collect the one or more decoded (then output vectors) and collect them into an output payload in the form of an output video signal to be made available to a sink device.

Figure 11:
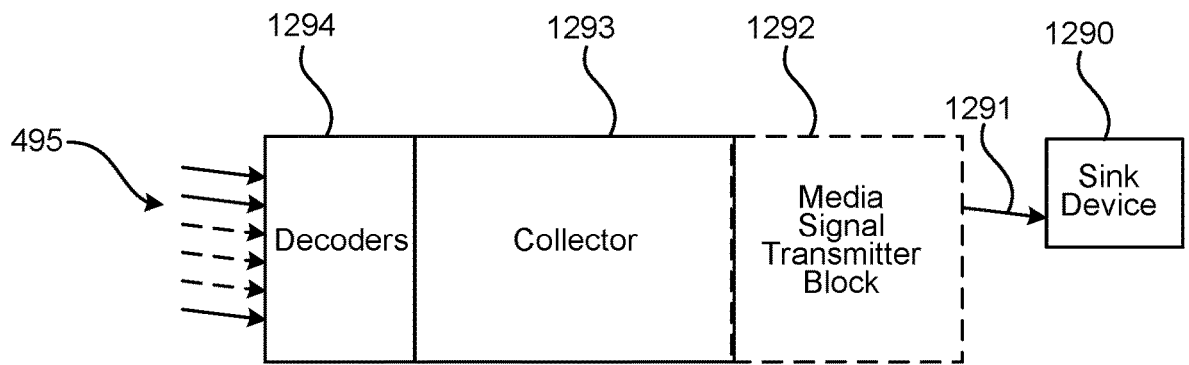
FIG. 11 a block diagram of a sink and a generic receiver arrangement for making available a reconstructed media signal to the sink.

FIG. 11 depicts a block diagram of a generic receiver which provides reconstructed sample signals to a sink device 1290 as an ordered sequence of reconstructed sampled signals, wherein the ordered sequence of signals 1291 is a media signal representing analog sampled signals derived from a sensor of the source device. In an embodiment of a sink device the individual sensors of the sink device can be an array of Light Emitting Diodes (LED), Organic Light Emitting Diodes (OLED), or Plasma pixel elements configured to display a series of images in a video format when provided the ordered sequence of sampled signals reconstructed from those signals received by the receiver arrangement (1294, 1293, 1292) which receives those signals from the one or more electromagnetic propagation pathways 495 (as also identified in FIG. 4A). In an embodiment, where the sink device is configured to display video signals, the ordered sequence of received sampled values can be accompanied by framing signals to define, at least the transitions from frame to frame of the media signal. Other light emitting sensor devices will have different signal formats and parameters but the reconstructed sampled signals can still be received and processed in accordance with the disclosures in this document.

Alternatively, the ordered sequence of sampled signals provided to sink device 1290 as an ordered sequence of reconstructed sampled signals being a media signal representing analog sampled signals created using a sampled signal formatting arrangement, so as to create a formatted signal in accordance with a predetermined format. By way of example, the format may be HDMI, DisplayPort, Digital Visual Interface or Serial Digital Interface standard for use with the image display device, for example a computer monitor and screen for a television, an advertising display, a display used to display flight information, or even a recorder of the media signals or a device for repeating or distributing the media signals, etc.

In FIG. 11 the functional block 1292 (dotted lines) is a media signal transmitter block used in this receiver arrangement to receive reconstructed signals (for example, sample values) and in some cases formatted media signals and process them as necessary to create the media signal to be displayed, recorded or further distributed by the sink device 1290. One of the formatted types into which there is a predetermined conversion of the ordered sequence of signals is, for example, Y, CbCr and another is R, G, B values of successive pixels wherein with other information such a framing information, the order of the pixels (for example: top left to bottom right of the frame), and other signals such as audio and others which are part of the respective standard can be appropriately identified and processed as required in accordance with the formatted media protocol. In an aspect, functional block 1292 is processing the video signal component of the mentioned formatted media signals that is disclosed herein, however, the transported media signals can also include audio, control, and other non-visual media signals.

Functional block 1293 includes an apparatus for collecting the ordered sequences of decoded signals into output vectors, there being as many output vectors as there are electromagnetic propagation pathways 495 and using one or more permutations to repeatedly make available representations of the input payload of sampled signals as streamed output payload signals to the sink device 1290.

The functional block 1293 includes one or more collector functional blocks to receive the decoded signals. In the generic receiver assembly, there are one or more collector functional blocks. Each collector has as many input vectors as there are decoders in the decoder functional block 1294, and there are as many decoders in the decoder block as there are incoming electromagnetic propagation pathways each providing signals for demodulation onto a respective number of decoder outputs as output vectors.

Figure 12A:
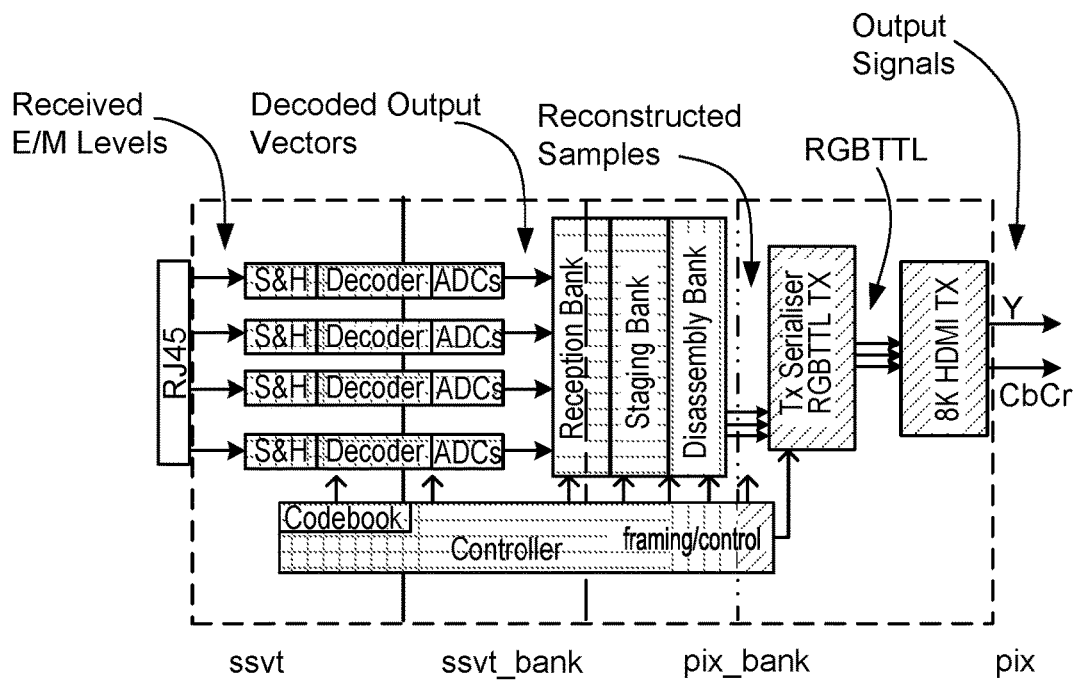
FIG. 12A depicts a block diagram an embodiment of a receiver assembly located at the sink end of an electromagnetic propagation pathway comprising an arrangement to receive the signals from (in this embodiment four electromagnetic propagation pathways; a decoder arrangement; and a collector arrangement for providing reconstructed payload of sampled signals for reconstruction of the payload in an HDMI video output signal.

In an aspect of a second apparatus, as depicted in FIG. 12A, for receiving signals from each of the one or more electromagnetic propagation pathways there is a respective sample and hold circuit for transforming the electromagnetic signals in an ordered series of samples of length L. The decoders apply the inverse of the predetermined code book used to encode a corresponding input vector to create decoded output vectors of length N as inputs to a reception bank using a collector having a first receiver permutation controller and a second receiver permutation controller each of them executing respective reverse permutations to those executed by the respective distributor and its respective first transmitter permutation controller and second transmitter permutation. In a general form there could be three permutation controllers in the collector and three permutation controllers in the distributor. Also in a general form there are different timing domains, in this second apparatus located at the sink, there are the following general timing domains: ssvt domain used by the decoders, which can be generated by an accurate clock (ssvt_clk) at the receiver or acquired and tracked based on the received electromagnetic levels; the ssvt_bank domain; the pixel_bank domain; and the pix domain, using a clock (pixel_clk) which can be generated from the acquired and tracked ssvt_clk, thus driving that portion of the sink device. The nomenclature of $f_{ssvt\_clk}$ and $f_{pixel\_clk}$ is also used in this document to denote the frequency of the respective clock rates within respective timing domains all of which are related to, in this case, to their respective decoding and collecting intervals. In an embodiment, there can be a counter running at a predetermined rate to provide a signal for the start or end of an interval and an end of counter event provides an indication of the end of a respective interval, such an event can be received in logical form or as a discrete signal and, for example, are a trigger received by an predetermined input (Interrupt) pin to a computer processor or as a predetermined memory location status change.

It is possible for there to be an implementation wherein ssvt_clk and pixel_clk are asynchronous. In this case, the source and sink must communicate the ratio $f_{ssvt\_clk}/f_{pixel\_clk}$ as a status signal down-cable or up-cable as required, (such functionality is disclosed in the referenced patent documents), thereby allowing the apparatus at the sink to recover pixel_clk. It is possible for the receiver at the sink to use predetermined values for the fullness of the banks and is also possible for the source to indicate the fullness of the banks in the transmitter and communicate that information to the sink, so the sink knows how many of the samples in each bank are valid and how many are to be filled in.

In an embodiment of the described clock-domain partitioning the permutation controllers, each maintain respective encoding/decoding interval counters to indicate the end of a respective interval. The end of an interval (it is possible to use a counter as a mechanism to determine when the end of an interval is reached) is when samples in the various respective banks are transferred into or out of the banks so the transfer is in phase when the transferred data occurs from one clock domain to another.

In a general form the first transmitter permutation controller implements one or more predetermined permutations which are different to the one or more predetermined permutations used by the second transmitter permutation controller. The inverse of those predetermined permutations is used by respective first and second receiver permutation controllers.

It is however possible for a predetermined permutation to change to another predetermined permutation and for that change to be periodic, or on demand, or algorithmically. How and why those options are invoked will be disclosed later in this specification. However, there are one or more benefits created by changing one or more permutations, in that the transmitted signals are obfuscated and that has security benefits, and can beneficially reduce signal errors and interference generation during transmission of signals from the respective encoder into the electromagnetic propagation pathway(s), in addition to the benefit of using a spreading code to more evenly distribute the available power of the signal across the available frequency spectrum in the electromagnetic propagation pathway. The type of security benefit disclosed above is in addition to the benefit of using predetermined code banks for encoding and reciprocal decoding and the option to change those codes periodically, or on demand, or algorithmically.

In an embodiment the Distributor/Collector permutations are varied algorithmically, analogous to varying the individual modulation intervals over the course of an encoding interval. Both are forms of dithering. The latter dithers in time, to spread out the clock edges in frequency space. The former dithers in a sequence space to spread out the number of possibilities in video signal reconstruction space, assuming correctly reconstructed samples. In an embodiment, a way to know how the collector knows what the distributor is doing even if it is varying, is to control the variance with a pseudo-random number generator for which the recipient would need to know the seed. Any interference then can then be included into the representation of predetermined or even random pixel information, one each subsequent frame, since the changes can be frame by frame and since the payload is video for human perception the human eye will average out this small change even if perceptible. However, if the collection and transmission of such related data was line-oriented, block-oriented or frame-oriented with frame oriented being preferable, even if it induces a frame delay and increases memory needs. Alternatively, there will be framing and clock synchronisation data communicated within a sub-band, therefore due to the very low data rate there will be ample capacity for the transport of low quantities of extra states for the sequencing synchronization of varying permutations.

In an embodiment, the permutation controller at the source end and permutation controller at the sink end are adapted to change one or more of the predetermined (as at the time or execution) distributor permutations and the respective predetermined (as at the time or execution) collector permutations at the boundary of a respective distribution and at the boundary of a respective collection interval.

Yet further there is the possibility of rate matching using one of the permutation controllers to match the frame modulation/demodulation rate (ENCODE/DECODE interval) with the video interface's native sample rate. It might be that the encoding and decoding is done on a full 4:4:4 payload of whichever is the format provided by the source and whichever is the format provided to the sink. In a further example there can be a native interface input parser to generate the 4:4:4 representation for the distributor and a different native interface output formatter to construct the required representation from the 4:4:4 output of the collector.

Figure 6:
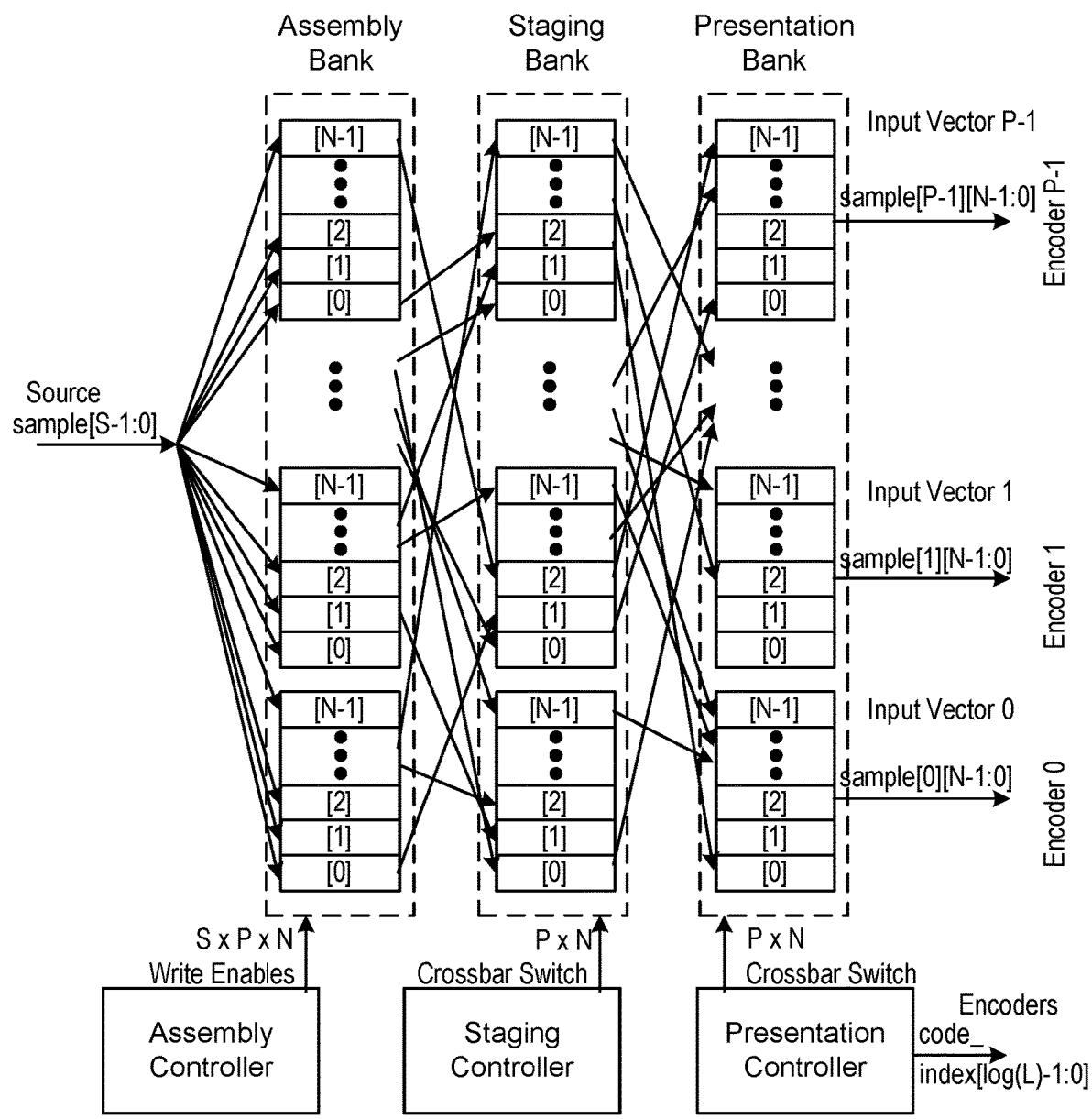
FIG. 6 depicts a block diagram of a generic version of a distributor architecture for use with a sink arrangement, wherein the sink arrangement provides a payload of sampled signals, the block diagram depicts an embodiment of a first, second and third transmitter permutation controller and one or more memory arrays.

FIG. 6 depicts a block diagram of an embodiment of a distributor apparatus for use with a source arrangement, wherein the source arrangement provides a payload of sampled signals, the block diagram depicts an embodiment of a first, second and third transmitter permutation controller each operating with predetermined intervals and one or more memory arrays. The samples from source may be permuted into the various memory arrays (sometimes referred to herein as a memory bank or bank), such that there are 3 permutation controllers shown in FIG. 6. However, no matter how many individual permutation controllers are present or used, exactly one permutation is realised (at a given time) between the source samples and encoder input vector locations.

Yet to be disclosed in this specification are embodiments wherein N samples are distributed to each bank but there may only be fewer than N samples to fill (Sample Fill (SF) where SF<N) into a bank or each bank. Further, there will be embodiments wherein the permutations used to transition into and between banks within a distributor can be the same or different. Yet further, wherein the permutations can be changed from the previous permutation at the same transition location as a function of time (so as to provide a security function). Furthermore, use of unused sample input vector locations (N−SF) in a bank (or in each bank) communicating sub-band data (information) may permit the communication of the scheme of the permutation or the one or more predetermined permutations used in the distributor, so that a corresponding collector can apply the corresponding inverse permutation or permutations.

Figure 7:
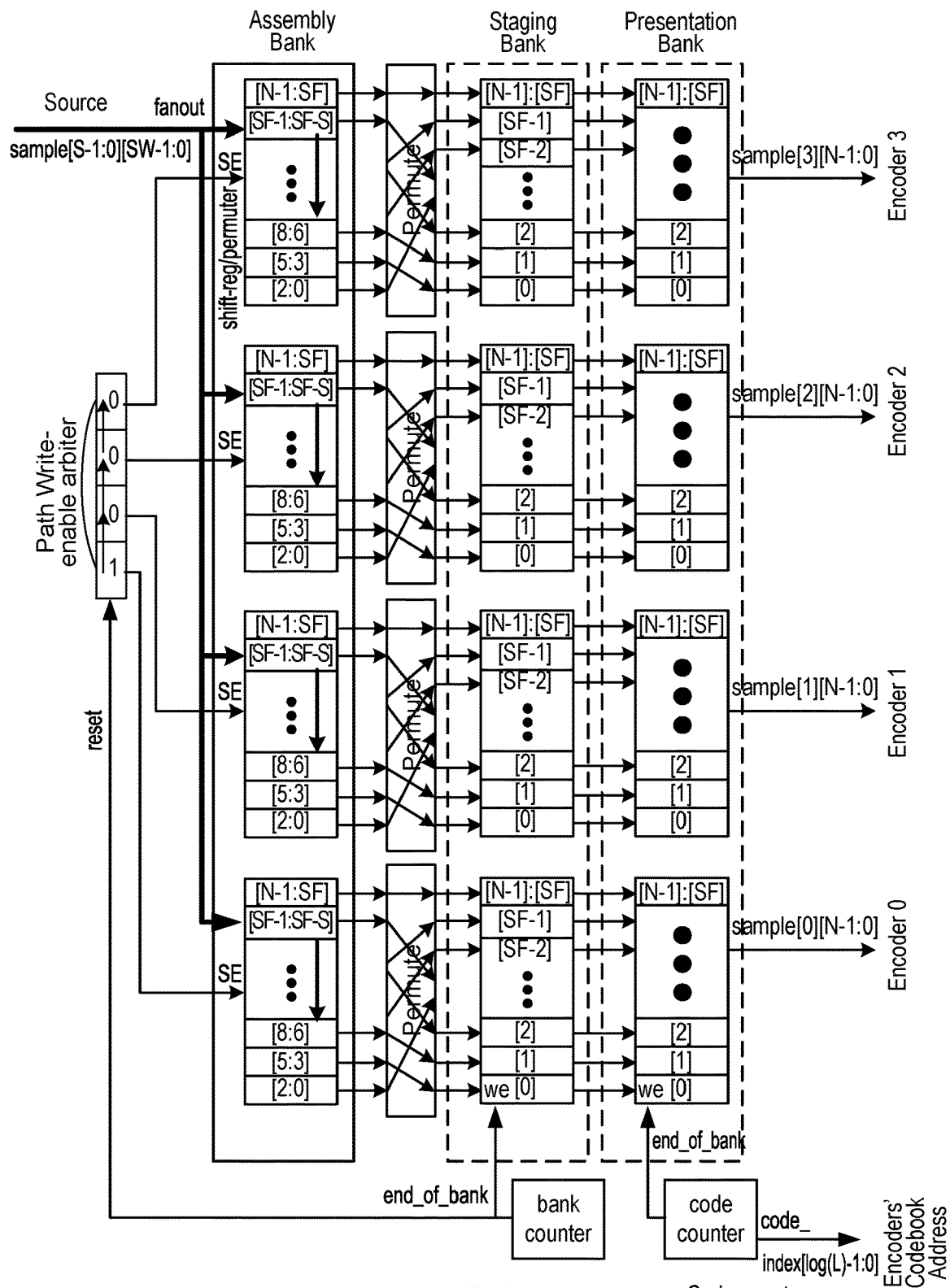
FIG. 7 depicts a block diagram of an embodiment of a distributor for use with a source arrangement, wherein the source arrangement provides a payload of sampled signals, the block diagram depicting an embodiment of a first and second transmitter permutation controller each operating within predetermined intervals and using one or more memory arrays to provide an input vector to each of four encoders 0 to 3.

FIG. 7 depicts a block diagram of a further embodiment of a distributor for use with a source arrangement, wherein the source arrangement provides a payload of sampled signals, the block diagram depicting an embodiment of a first and second transmitter permutation controller each operating with predetermined intervals and one or more memory arrays. In the first permutation controller, S samples per cycle are coming in and inserted into the Assembly bank. Every cycle the samples' destination path is changed by the path-write enable arbiter (the controller) in a round-robin fashion, and inside each path's memory array samples are shifted down the array. Note that in the example given, N>SF, so N−SF spaces in each path's memory array, remain free of samples. In the second permutation controller, the samples remain in their respective memory array going into the staging bank memory array, and are permuted in a predetermined way which may be hardwired or hard coded. The samples are taken by the staging bank every bank interval, indicated by the end-of-bank issued by the bank counter. The samples remain in their respective locations going into the presentation bank's memory array every bank interval, indicated by the end-of-bank issued by and from the code counter. This happens out of phase from the bank counter's end-of-bank indication, but at the same rate, so there are no clock domain synchronization issues.

FIG. 7 depicts a Distributor architecture and its relationship with the Encoders E0 to E3. The first permutation controller receives samples (S samples at a time) and permutes and stores them into an assembly bank. FIG. 7 also depicts a staging bank which is filled in accord with a second permutation of the contents of the filled assembly bank. At the end of the filling of the staging bank (using a further permutation which may be different from the earlier used permutation), the contents of the staging bank are loaded into the presentation bank, which is the bank exposed to the Encoders. The content of the presentation bank stays valid for an entire encoding interval, and is used by the Encoder (in the ssvt_clk domain) during the encoding interval. There is a possibility for an implementation wherein fssvt_clk and fpixel_clk are asynchronous. In this case, the two ends (source and sink) must communicate the ratio fssvt_clk/fpixel_clk in a sub-band, thereby allowing the receiver at the sink end to recover fpixel_clk as precisely as it can. Note that the ratio must be at least one and is constrained only to rational values of fixed arithmetic precision. The staging bank is loaded once per bank interval, as is true for the presentation bank, but they are loaded at different bank interval phases, so that the clock domain crossing is safe. The presentation bank is in synchronization with the encoders' functionality and will expose valid data to the encoders.

Figure 7A:
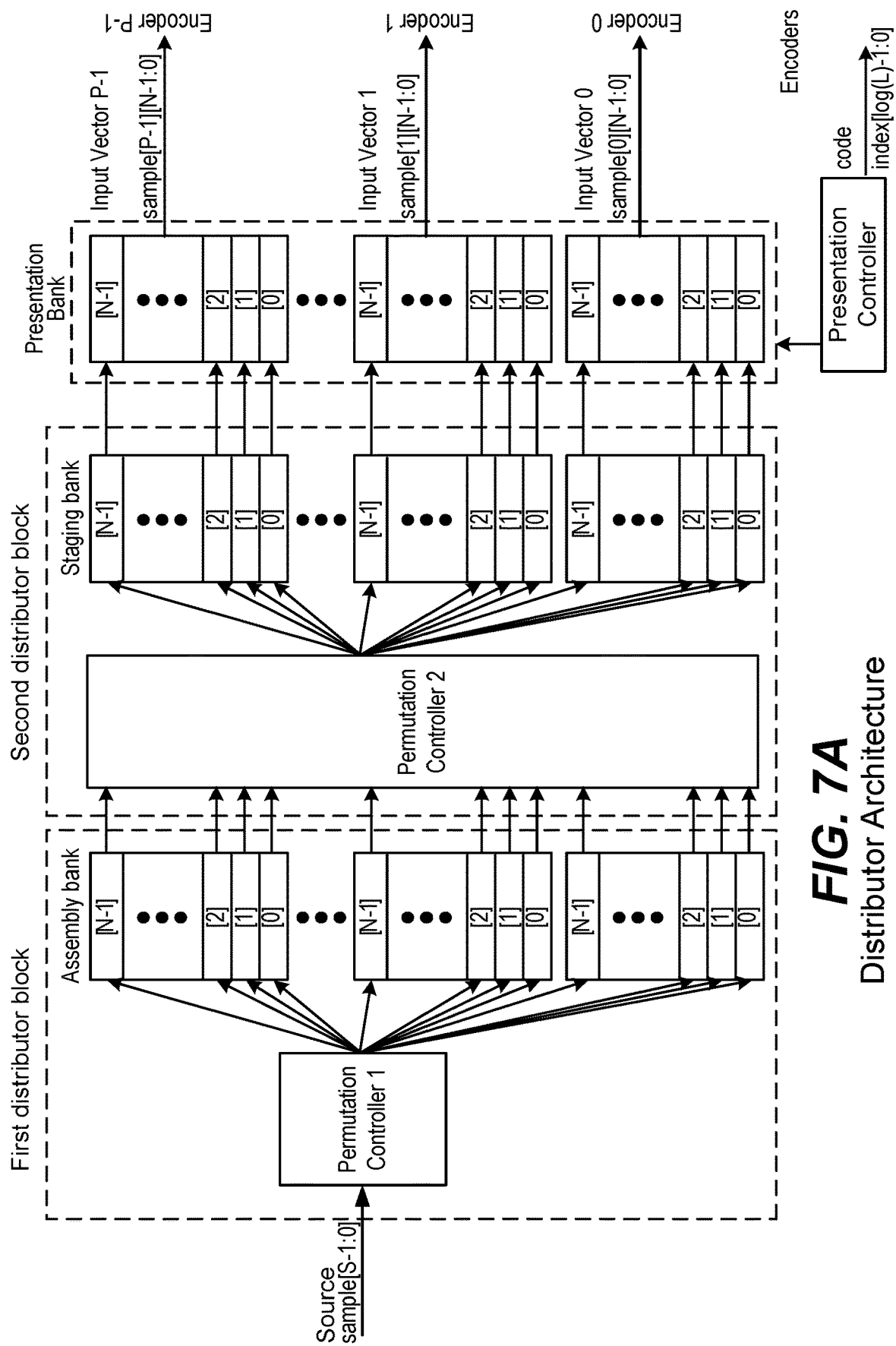
FIG. 7A depicts a block diagram of an embodiment of a distributor architecture for use with a source arrangement, generalised with respect to the number of EM pathways and the size of the encoder input vectors.

FIG. 7A provides a general embodiment of a distributor with first and second distributor blocks with their respective permutation controllers and memory arrays and a presentation bank with its memory array and controller.

Figure 8:
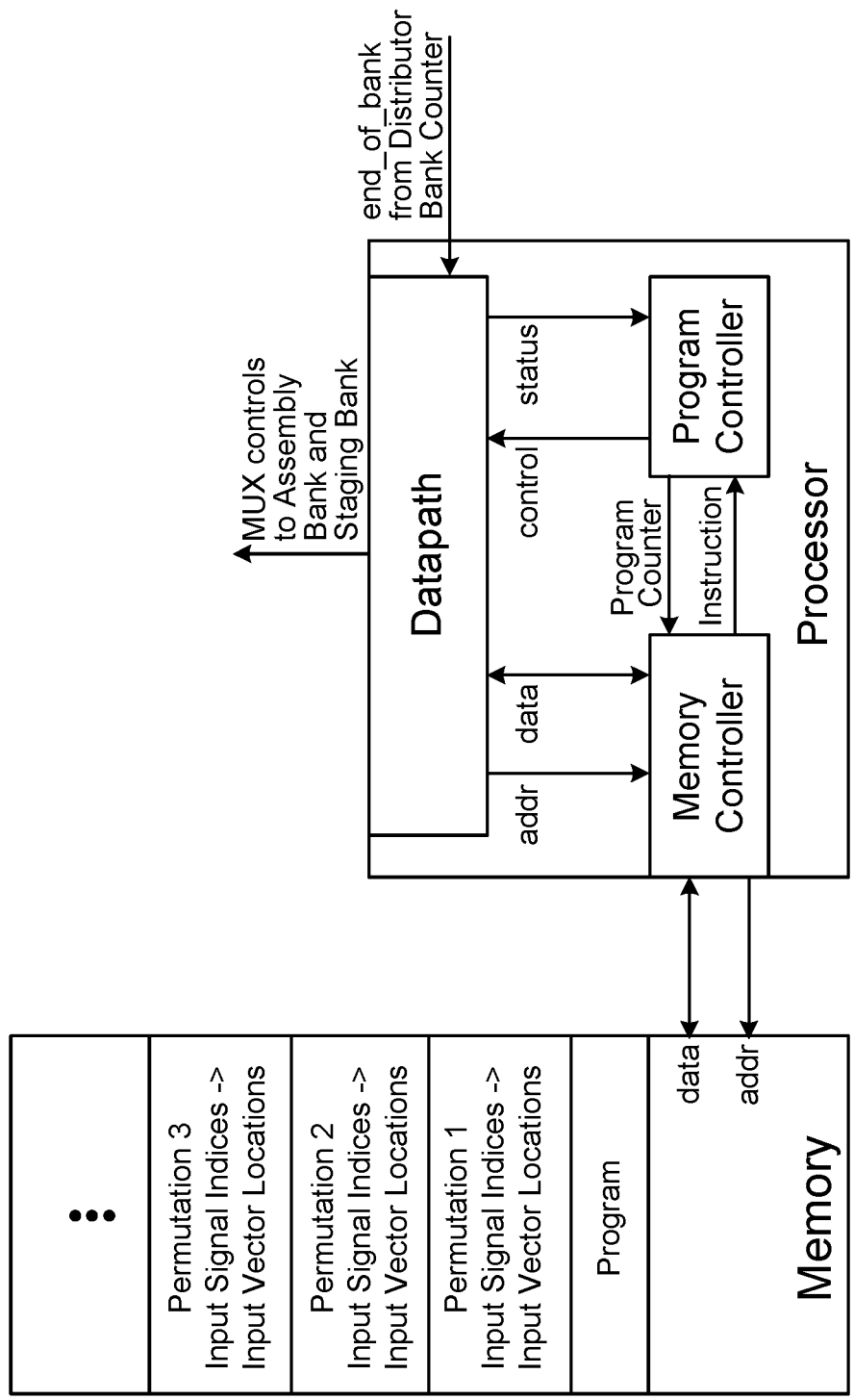
FIG. 8 depicts a block diagram of an embodiment of a transmitter permutation controller implemented as a processor and an associated memory for storing the executable code and at least one permutation.

FIG. 8 depicts a block diagram of an embodiment of a first transmitter permutation controller implemented as a processor and an associated memory for storing the executable code and at least one permutation. The processor can select to change to different permutation types every bank interval. The permutation controls are taken from memory and are sent as data mux and write-enable controls to the Assembly bank's memory array.

The processor approach depicted in FIG. 8 is but one embodiment of a permutation controller. It is possible for the controller to be configured as a controllable switching device (such as a shift register) or one of one or more fixed but selected controllers of the permutation to be used at a respective location between the different banks and there can be different permutations applied between the different banks.

Figure 9:
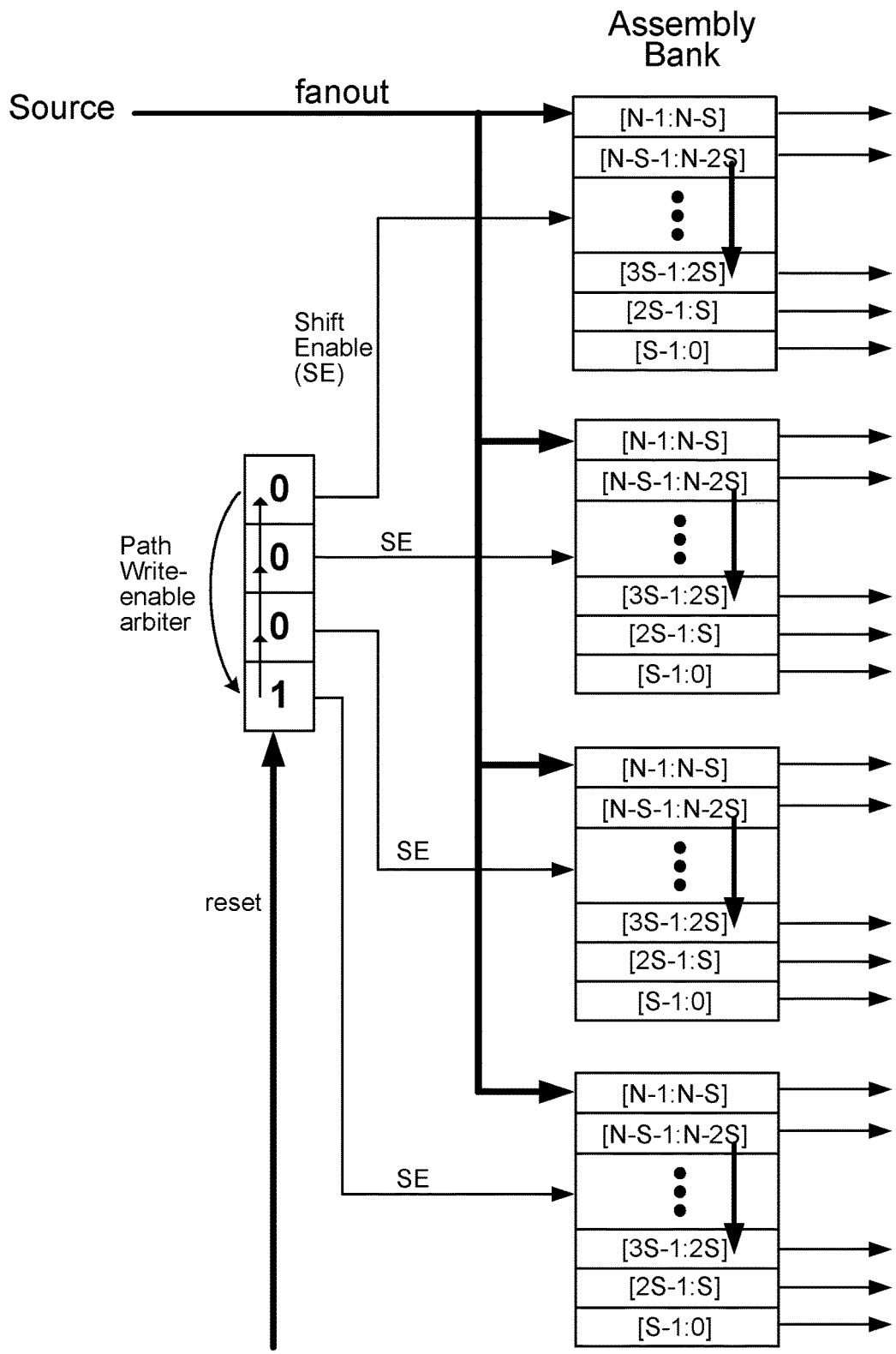
FIG. 9 depicts a diagrammatic representation of a transmitter permutation controller implemented as a shift register, generalised for P encoders.

FIG. 9 depicts a diagrammatic representation of a first transmitter permutation controller implemented as a shift register, which may be generalised for P encoders. Each encoder's input vector is implemented as its own shift register, where S locations are shifted every cycle. Samples path destinations are rotated in a round-robin fashion by the path-write enable arbiter which decides to which path a sample is destined. This is a particularly efficient implementation, as the fanout of the incoming S samples is limited to only the first S locations in each path input vector. Of course, the shift register can be implemented in the other direction of the input vector, so that the oldest samples are located at the lower indices. Note that if N/S is not an integer number, the implementer can choose an SF parameter (SF<N) which is divisible by S, and limit the shift register to SF locations instead of N.

Figure 10:
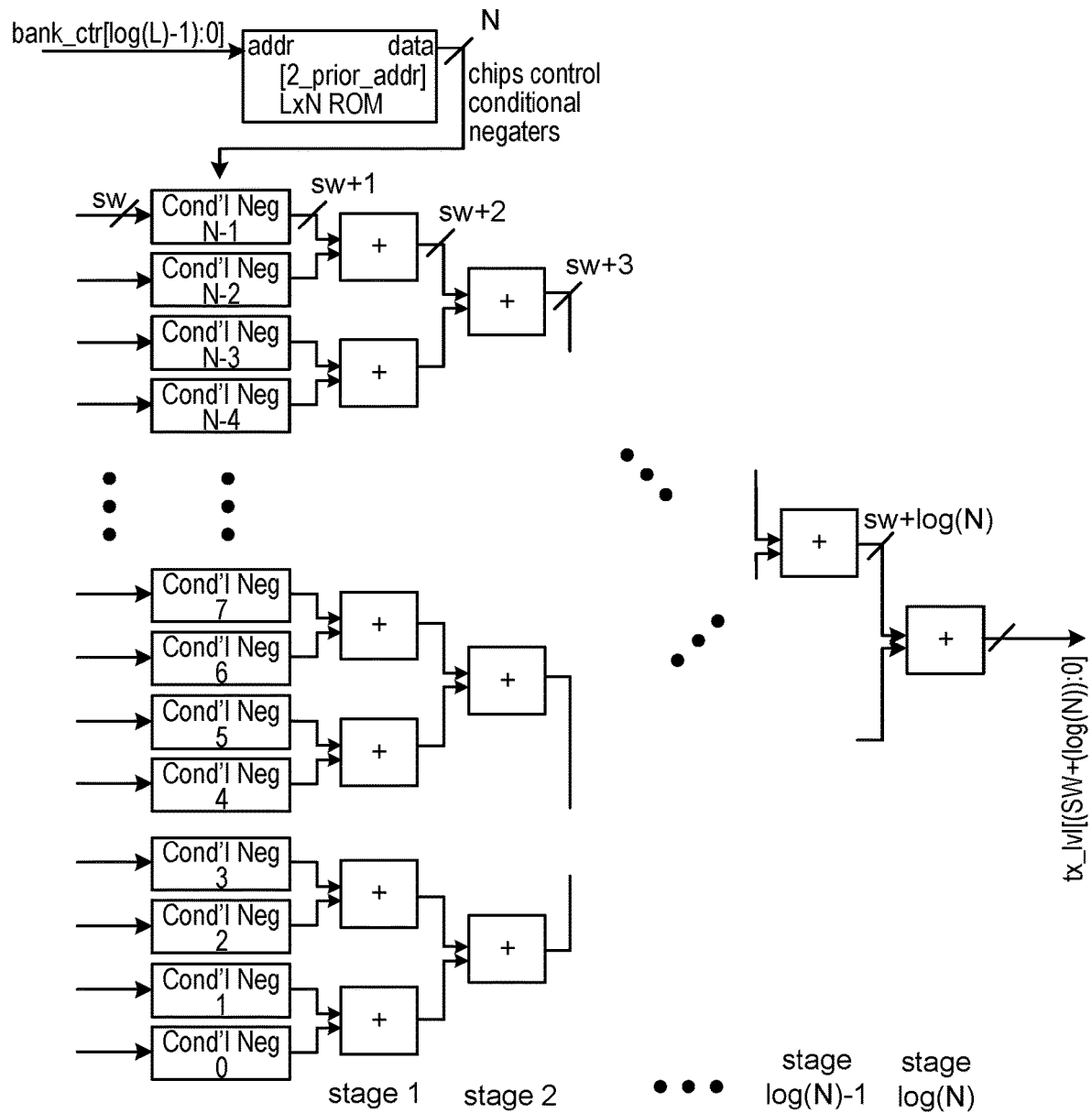
FIG. 10 depicts an embodiment of an arrangement of an encoder there being an encoder for each of the four input vectors made available from the distributor of FIG. 4B and FIG. 7, the single encoder providing encoded samples to a respective one of four electromagnetic propagation pathways.

FIG. 10 depicts an embodiment of an arrangement of an encoder, there being an encoder for each of the four input vectors made available from the distributor of FIG. 7, the single encoder providing encoded samples to a respective one of four electromagnetic propagation pathways. This figure is an embodiment of one of P encoders and is a preferred embodiment for a digital implementation for 8-bit samples. There are P EM pathways and each EM path is terminated by a paired Encoder and Decoder. Each such pair conveys a succession of N-sample input vectors, applying L modulation/demodulation cycles per Encoding/Decoding interval of a single bank.

FIG. 12A depicts a block diagram of an embodiment of a receiver assembly located at the sink end of an electromagnetic propagation pathway and which combines elements which are depicted separately as FIGS. 4B and 7A for the generic transmitter assembly. In this figure the reconstructed samples are forwarded to an HDMI transmitter, and so they are digitized and serialized before going into the HDMI transmitter.

FIG. 12B provides a table enumerating the relationships among the parameter values for the embodiment shown in FIG. 12A, providing an example for 8K video received over 4 EM pathways.

Figure 13A:
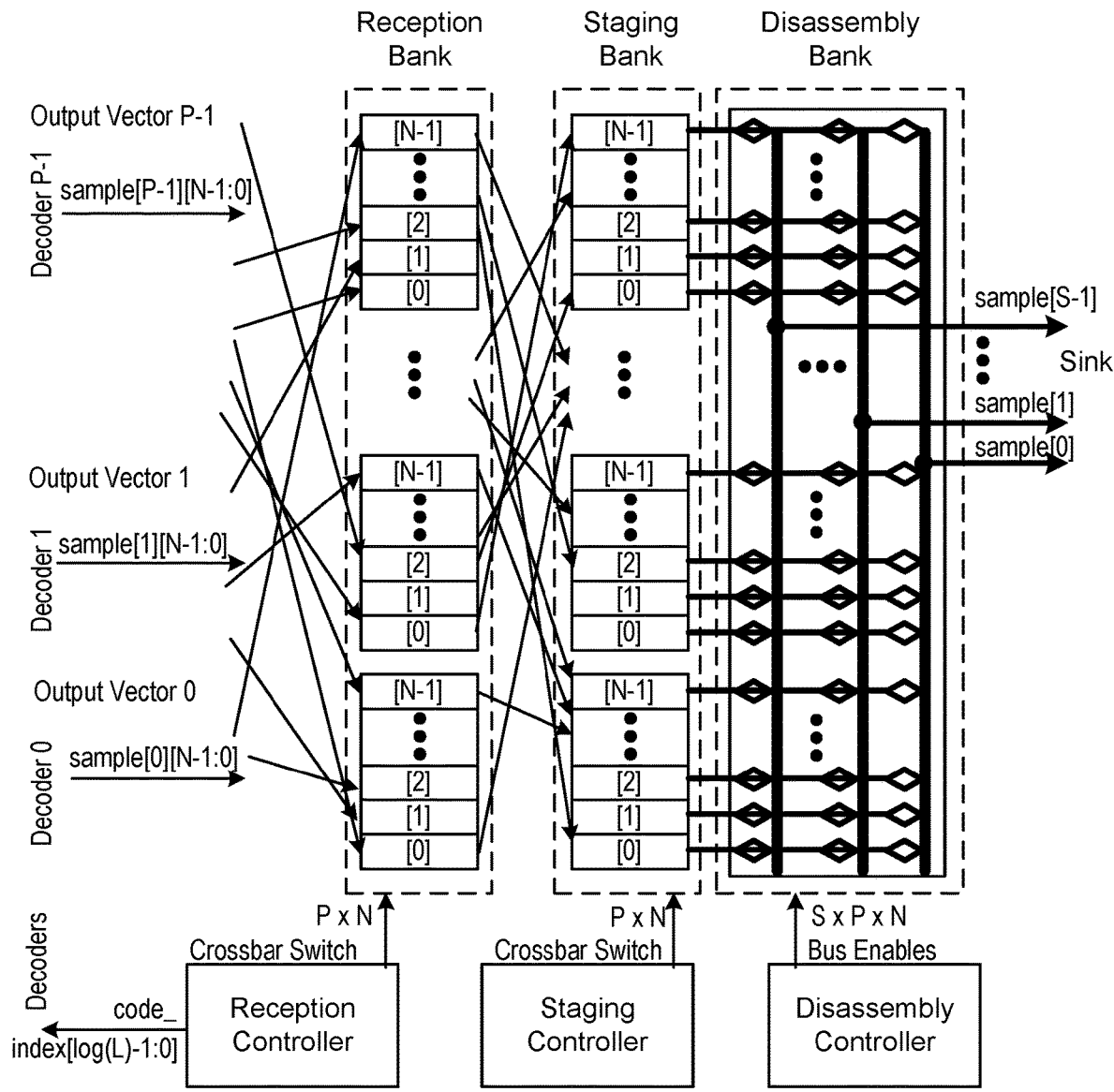
FIG. 13A depicts a block diagram of an embodiment of a collector for use with a sink arrangement, the block diagram depicting the input of decoded output samples from decoders and the collector having a first and second receiver inverse-permutation controllers each operating within predetermined intervals and one or more memory arrays wherein the sink arrangement is provided a reconstructed payload of sampled signals.
Figure 13B:
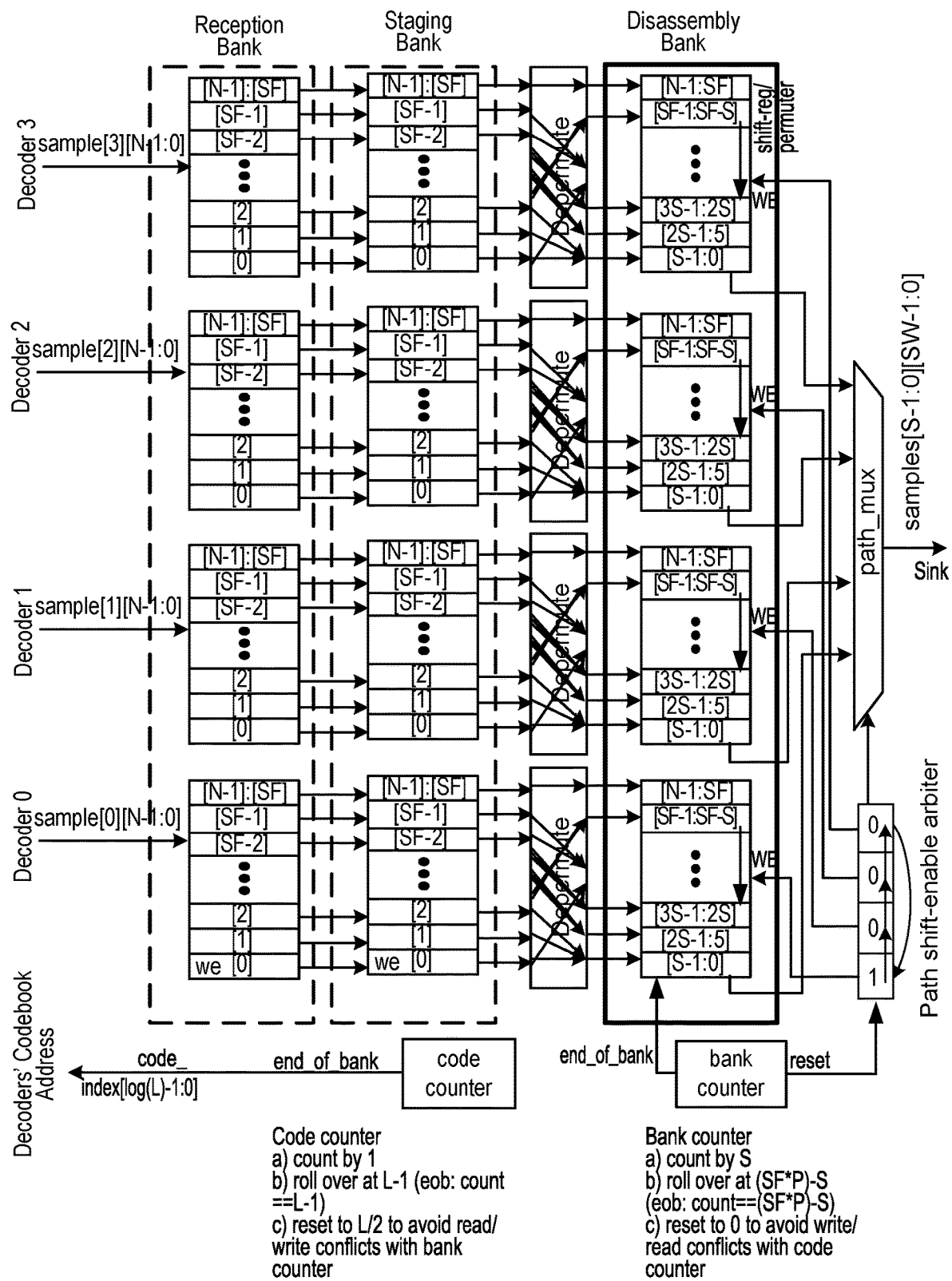
FIG. 13B depicts a block diagram of a further embodiment of a collector architecture generalised with respect to the number of EM pathways and the size of the encoder input vectors.
Figure 13C:
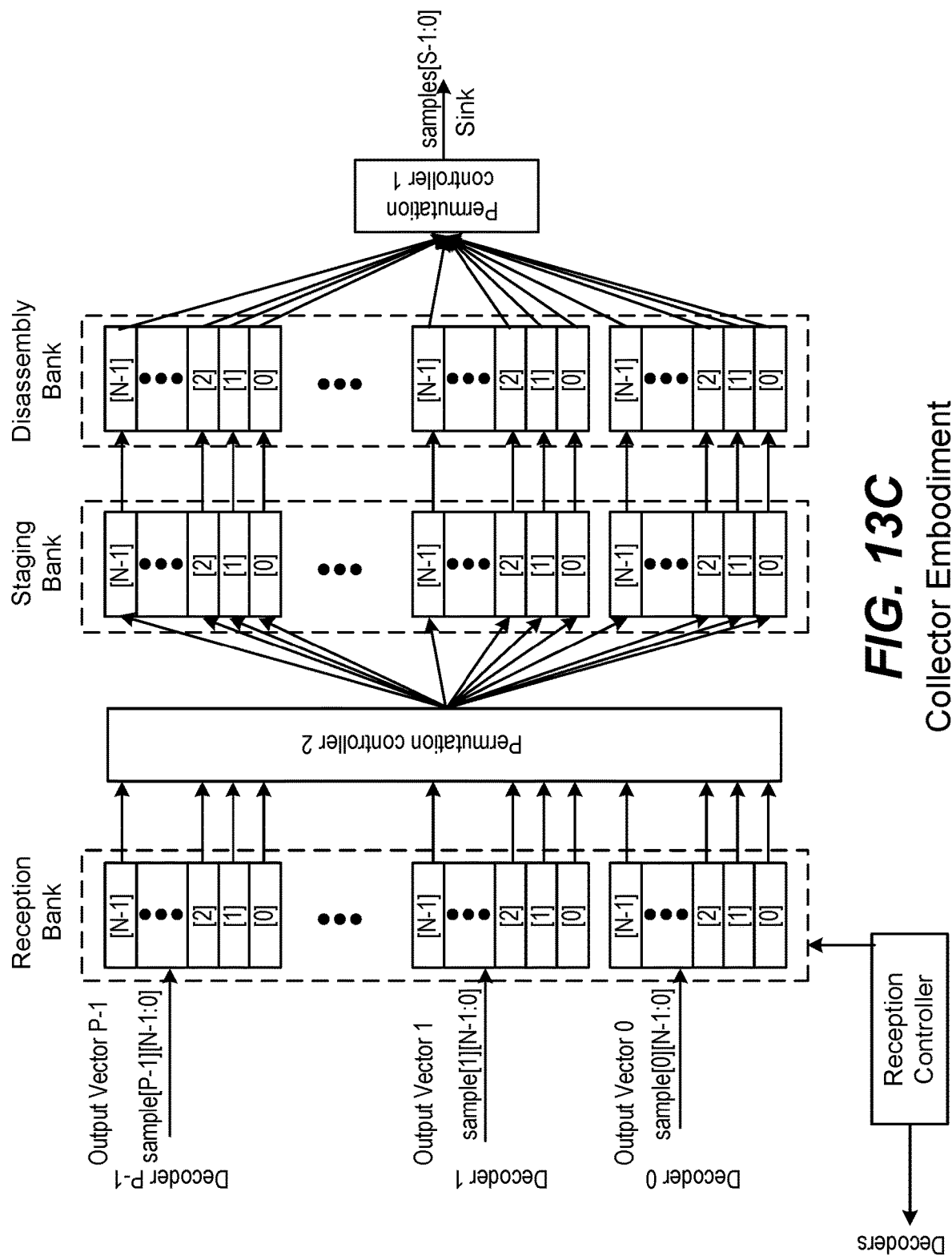
FIG. 13C depicts a block diagram of a further embodiment of a collector for use with a sink arrangement generalised with respect to the number of EM pathways and the size of the encoder input vectors.

FIGS. 13A, 13B and 13C depict block diagrams of embodiments of a collector for use with a receiver assembly, the block diagrams depict the input of decoded output samples from decoders and the collector having a first (reception controller and staging controller in FIG. 13A) and second (disassembly controller in FIG. 13A) receiver permutation controllers each operating with predetermined intervals and one or more memory arrays wherein the sink arrangement is provided a reconstructed payload of sampled signals.

Figure 14:
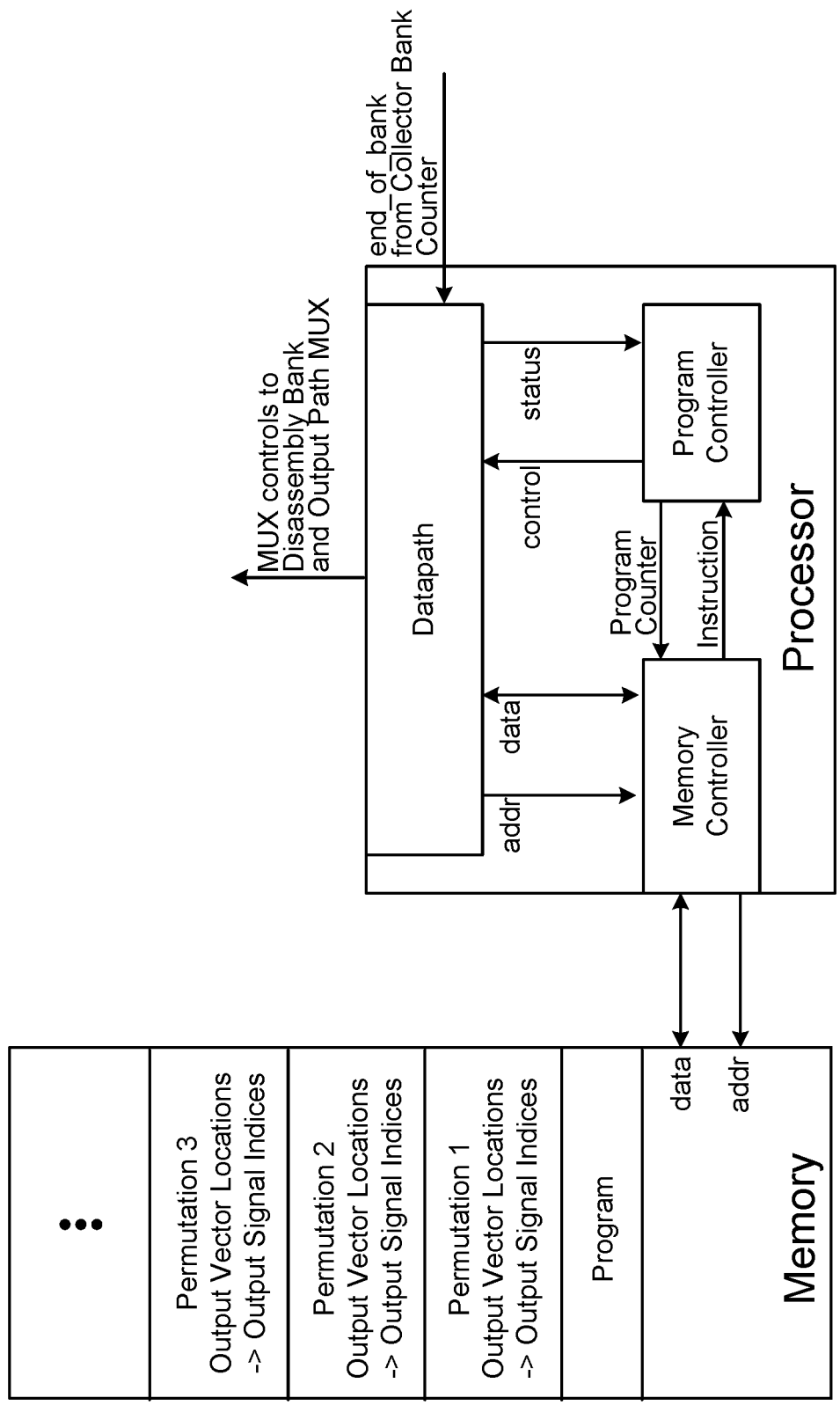
FIG. 14 depicts a block diagram of an embodiment of a first receiver permutation controller implemented as a processor and an associated memory for storing the executable code and at least one permutation.

FIG. 14 depicts a block diagram of an embodiment of a first receiver permutation controller implemented as a processor and an associated memory for storing the executable code and at least one permutation.

Figure 15:
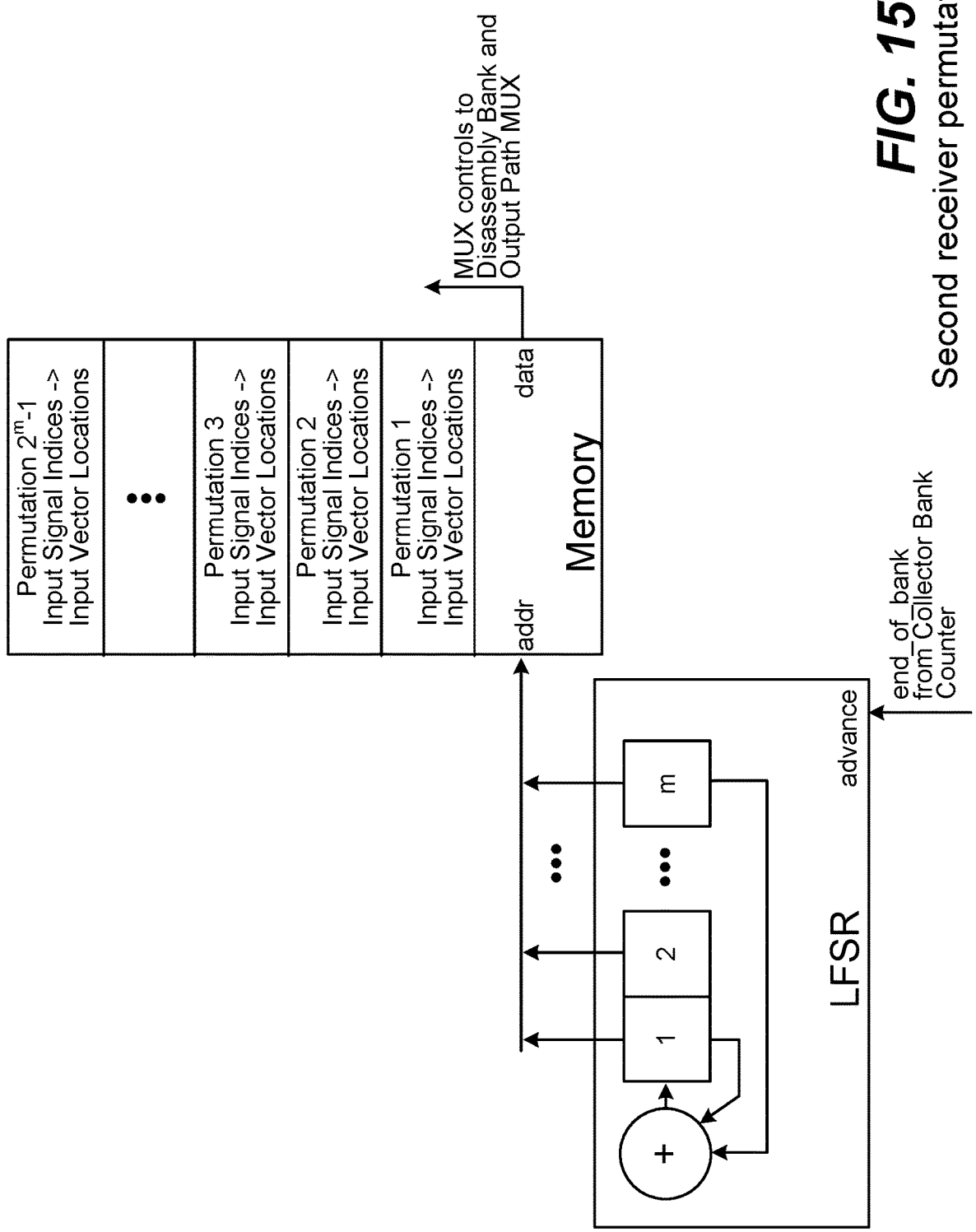
FIG. 15 depicts a diagrammatic representation of a second receiver permutation controller implemented as a shift-register based controller, generalised for P Decoders.

FIG. 15 depicts a diagrammatic representation of a second receiver permutation controller implemented as a processor and an associated memory for storing the executable code and at least one permutation.

Figure 16:
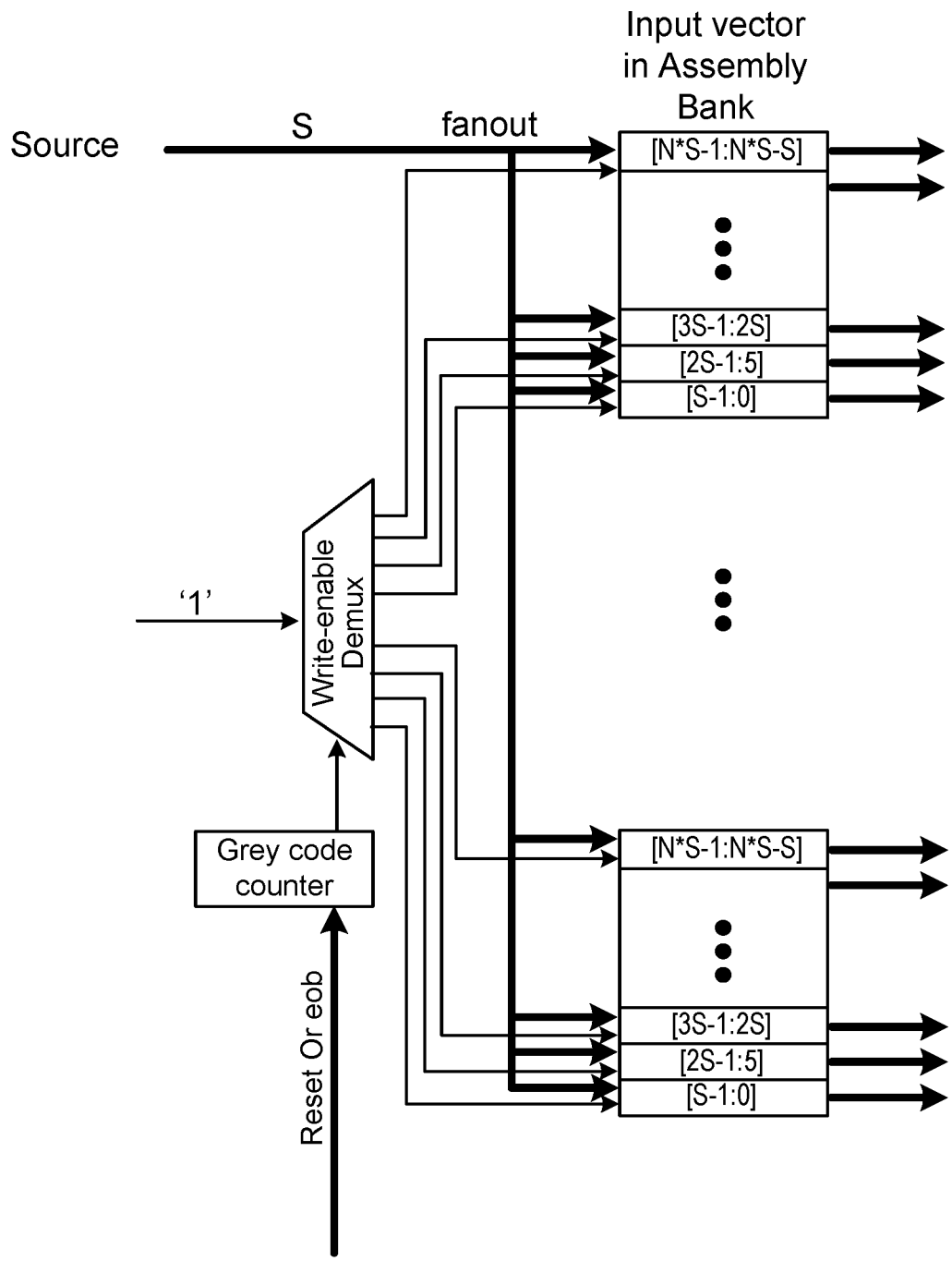
FIG. 16 depicts a diagrammatic representation of a first distributing permutation, permuting incoming samples into the input vectors at locations of grey code addressing.

FIG. 16 depicts a diagrammatic representation of a first distributing permutation, permuting incoming samples into the input vectors at locations of grey code addressing. The incoming samples S received serially are fanned out into all of the input vectors' locations. The write-enable for each location in the input vector is set by the grey-code counter using a demultiplexer. The EOB (End-of-Bank) indication resets the grey counter to 0.

Figure 17:
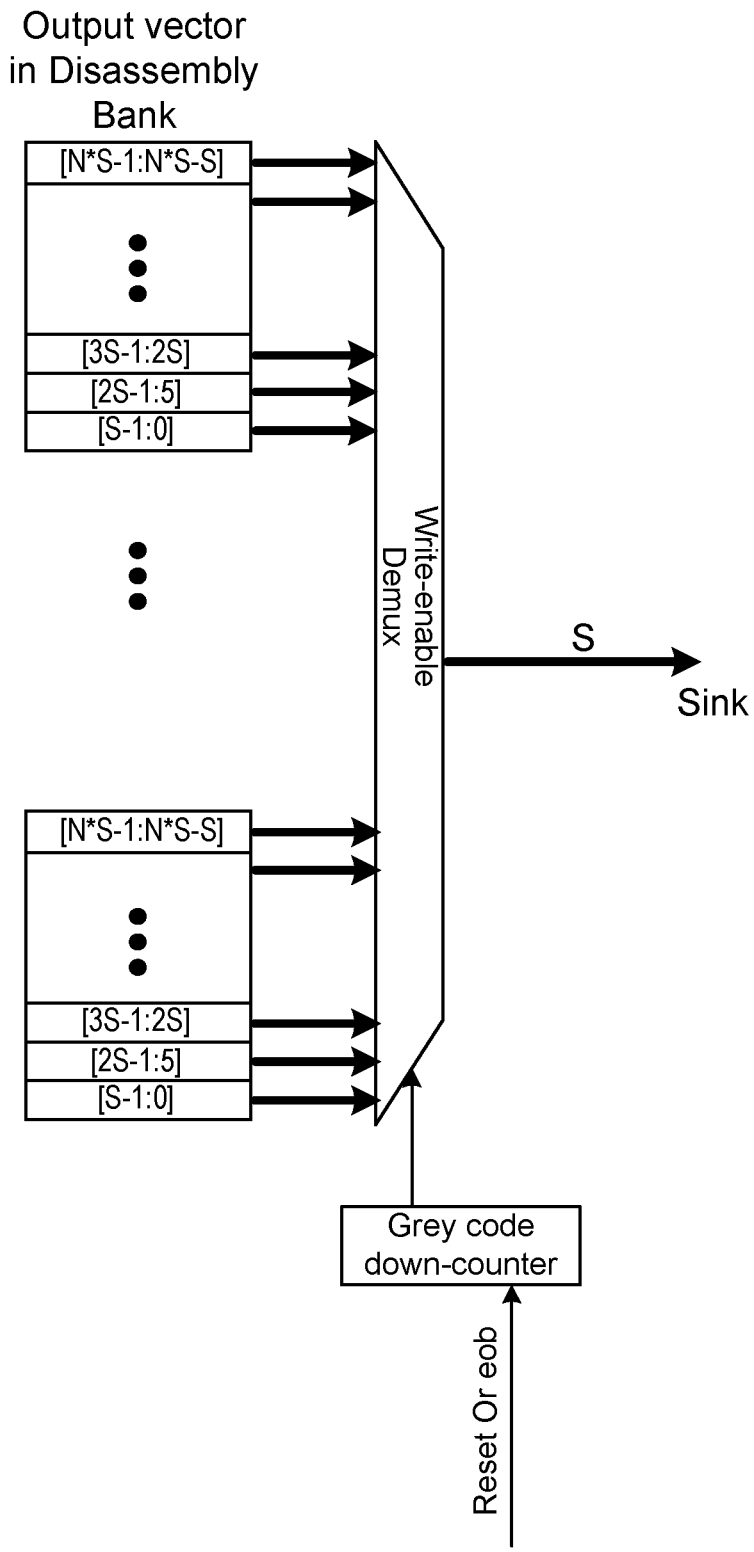
FIG. 17 depicts a diagrammatic representation of the inverse of a distributing permutation used by a collector.

FIG. 17 depicts a diagrammatic representation of the inverse of a distributing permutation used by a collector. The samples in the output vector are sent serially out (S at a time) by multiplexing their locations in a grey code counter. The EOB (End-of-Bank) indication resets the grey counter to 0.

Figure 18:
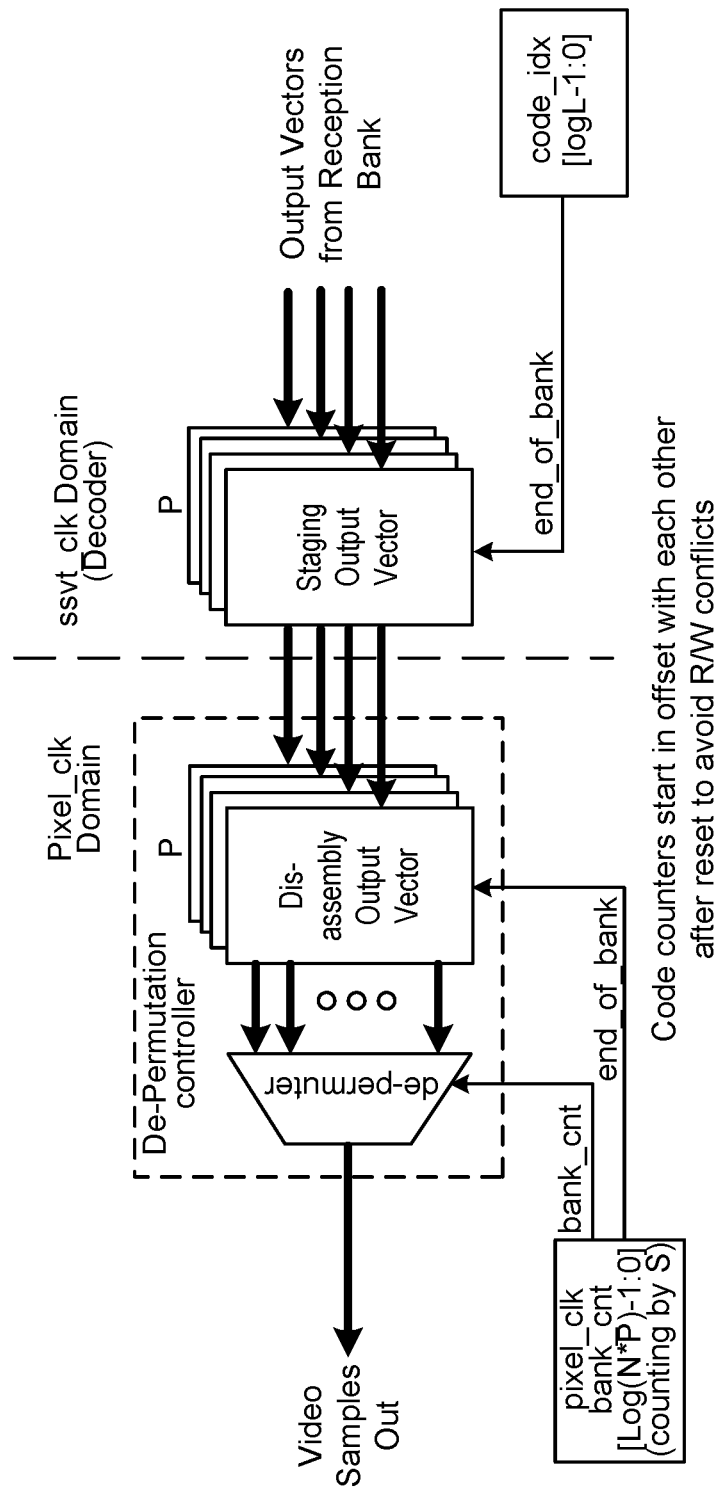
FIG. 18 depicts a block diagram of an embodiment of a sink collector receiving reconstructed payload signals in HDMI format (at least of the video payload portion)

FIG. 18 depicts a block diagram of an embodiment of a sink collector receiving reconstructed payload signals from the decoders into the staging bank, then to the disassembly bank, then out to the sink. FIG. 18 shows that the staging bank is in the ssvt clock domain using a code counter, while the disassembly bank is in the pixel clock domain using a bank counter. The counters count the exact same decoding interval, but in different clock domains. Upon reset, the counters are reset with an offset from each other so that their respective end-of-bank indications are always in that same offset which avoids read/write clock domain synchronization issues.

Figure 19:
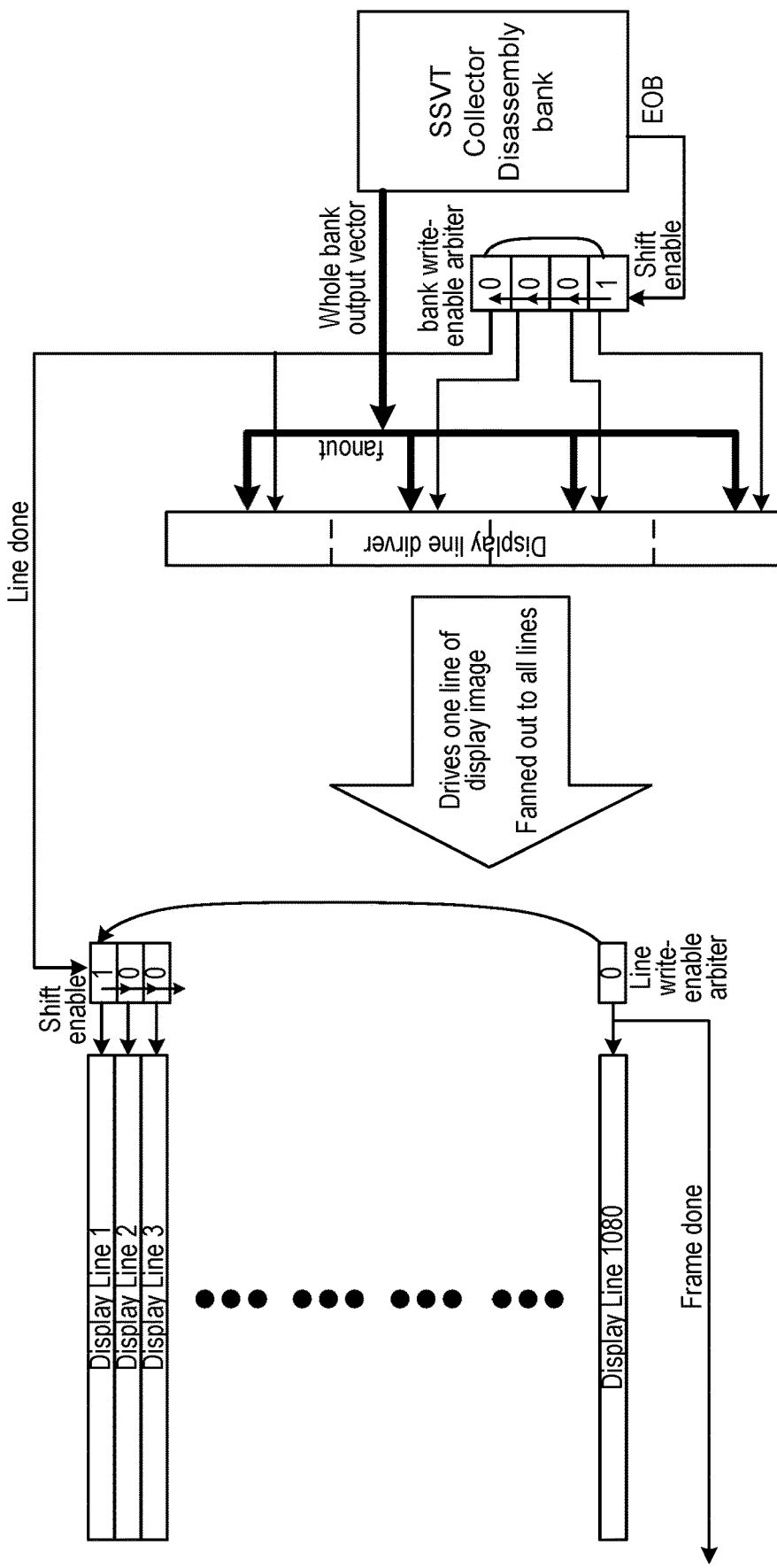
FIG. 19 depicts a block diagram of an embodiment of a sink receiving reconstructed payload signals that are delivered to a display driver.

FIG. 19 depicts a block diagram of an embodiment of a sink receiving reconstructed payload signals that are delivered to a display driver. When a disassembly bank is full at end-of-bank (EOB), the samples are loaded into a part of the display line driver. There are a few banks in a single image line, and they are arbitrated (in a simple shift register) into the line driver one by one until the line is full. When the last bank in a line is written, this is also an indication that the line is ready (line done), and can be written into the display buffer. The display buffer contains all the lines in the image, and the lines are also written one at a time in a simple shift-register arbitration, coming from the "line-done" indication. When the last line of the image is written, this is also an indication that the whole frame is ready (frame done).

Figure 20:
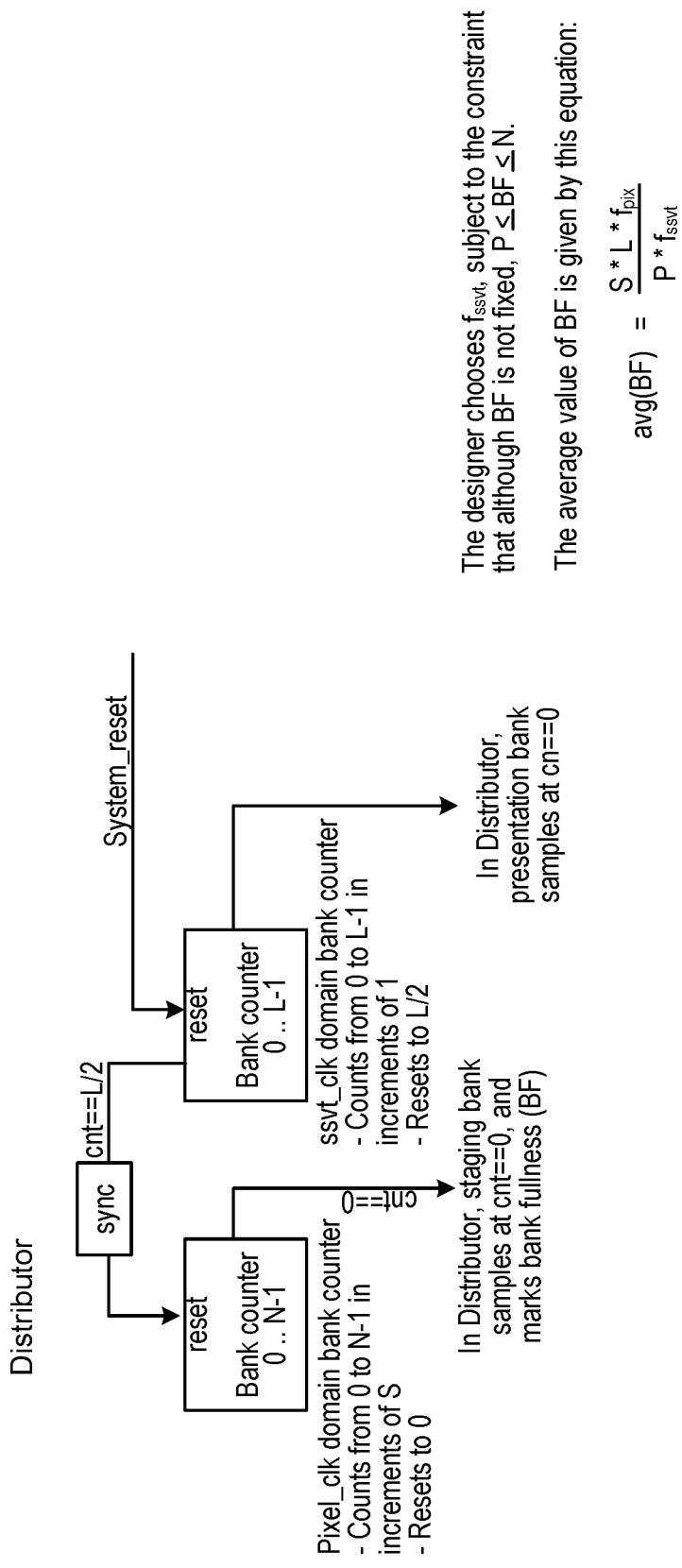
FIG. 20 depicts a block diagram of the Distributor controllers in an asynchronous ssvt_clk and pixel_clk.

FIG. 20 depicts a block diagram of the Distributor controllers with an asynchronous ssvt_clk and pixel_clk. In an asynchronous design, the ssvt_clk and pixel_clk are not related, which means that the fullness of samples (replaces the SF parameter) in a bank (bank fullness=BF) is not constant between distributing intervals, the average of BF is: (S*L*Fpixel_clk)/(P*Fssvt_clk). In an asynchronous design there is a necessity to mark BankFull (BF) in each transmitted bank. The code counter in the ssvt_clk domain dictates the actual encoding/distributing interval, and resets the pixel_clk domain's bank counter when it reaches L/2 count. When the Bank counter is reset, it resets the Assembly bank, samples the staging bank and marks the BF reached in that interval.

Figure 21:
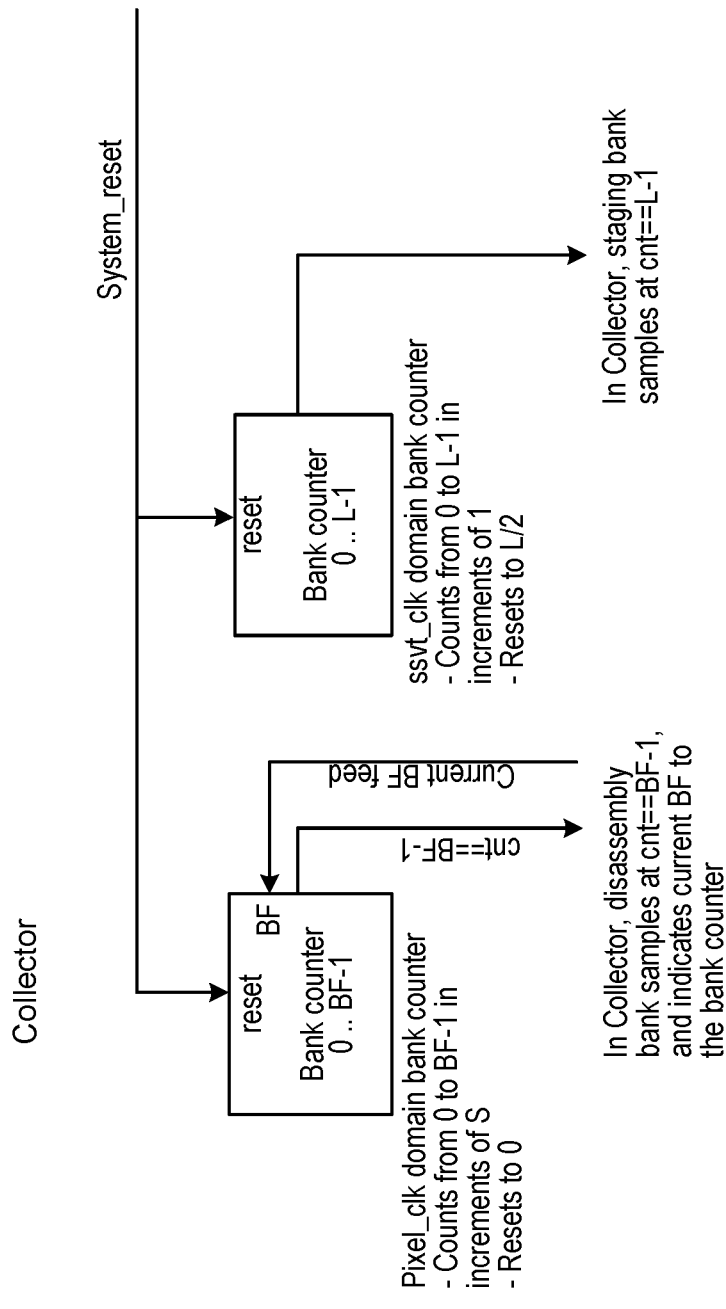
FIG. 21 depicts a block diagram of the Collector controllers in an asynchronous ssvt_clk and pixel_clk.

FIG. 21 depicts a block diagram of the Collector controllers with an asynchronous ssvt_clk and pixel_clk. The code counter in the ssvt_clk domain dictates the actual decoding interval, but the decoded bank has varying Bank Full (BF), as was marked by the distributor prior to transmission. The BF indication is extracted and used in the Disassembly bank's bank counter to determine the number of actual samples in the bank, and this sets the limit of the bank counter in this bank. The pixel_clk and ssvt_clk in the collector must match the frequencies of the pixel_clk and ssvt_clk in the distributor for the synchronization mechanism to work in an asynchronous design.

It is possible to change one or more of the permutations (but that should be coordinated between the distributor and collector) to apply to the corresponding input and output vectors and synchronised with the respective clocks of the respective banks. The memory may be used for transitory and non-transitory storage of the operating system and additional software modules or instructions, algorithms and copies of code sets and permutations and algorithms for changing a predetermined permutation and the manner and timing of the change. When the permutation is to be generated on the fly at the distributor there can be an arrangement for generating the seed which is then used for generating a permutation. A seed is a number (and it can be a vector) used to initialize a pseudorandom number generator. Random seeds can also be generated from an input which is expected to be random, such as for example, the movements of a mouse or tracking device, the state of the computer system (such as the combination of the time and the state of a register), or it can use a cryptographically secure pseudorandom number generator or from a hardware random number generator.

If there is to be a change to a predetermined permutation under programmed control it can be executed by a respective permutation controller so as to change to a newly generated permutation wherein the newly generated permutation is based on a permutation generating algorithm using a predetermined seed. Each permutation controller has a memory store element and stored therein are one or more predetermined permutation generation seeds. Under executable control a predetermined seed is made available to a respective permutation controller from a respective store, wherein the making available to a respective permutation controller from a respective store of a predetermined seed is under programmed control executed by a respective permutation controller so as to change the predetermined seed periodically, or on demand from the permutation controller or initiated by a received command from the sink device or a collector permutation controller, or algorithmically.

Ssvt Signal, Encoding and Decoding

As mentioned above, various embodiments of the present invention disclose transmission and reception of SSVT signals over EM pathways. The below provides more detail on the encoding and decoding of such signals.

For the purposes of this disclosure, an electromagnetic signal (EM signal) is a variable represented as electromagnetic energy whose amplitude changes over time. EM signals propagate through EM paths, such as a wire pair (or cable), free space (or wireless) and optical or waveguide (fiber), from a transmitter terminal to a receiver terminal. EM signals can be characterized as continuous or discrete independently in each of two dimensions, time and amplitude. "Pure analog" signals are continuous-time, continuous-amplitude EM signals; "digital" signals are discrete-time, discrete-amplitude EM signals; and "sampled analog" signals are discrete-time, continuous-amplitude EM signals. The present disclosure discloses a novel discrete-time, continuous-amplitude EM signal termed a "spread-spectrum video transport" (SSVT) signal that is an improvement over existing SSDS-CDMA signals. SSVT refers to the transmission of electromagnetic signals over an EM pathway or pathways using an improved spread-spectrum direct sequence (SSDS)-based modulation.

Code Division Multiple Access (CDMA) is a well-known channel access protocol that is commonly used for radio communication technologies, including cellular telephony. CDMA is an example of multiple access, wherein several different transmitters can send information simultaneously over a single communication channel. In telecommunications applications, CDMA allows multiple users to share a given frequency band without interference from other users. CDMA employs Spread Spectrum Direct Sequence (SSDS) encoding which relies on unique codes to encode each user's data. By using unique codes, the transmission of the multiple users can be combined and sent without interference between the users. On the receive side, the same unique codes are used for each user to demodulate the transmission, recovering the data of each user respectively.

An SSVT signal is different from CDMA. As a stream of input video (for example) samples is received at encoders, they are encoded by applying an SSDS-based modulation to each of multiple encoder input vectors to generate the SSVT signals. The SSVT signals are then transmitted over a transmission medium. On the receive side, the incoming SSVT signals are decoded by applying a corresponding SSDS-based demodulation in order to reconstruct the samples that were encoded. As a result, the original stream of time-ordered video samples containing color and pixel-related information is conveyed from a single video source to a single video sink, unlike CDMA which delivers data from multiple users to multiple receivers.

Figure 22:
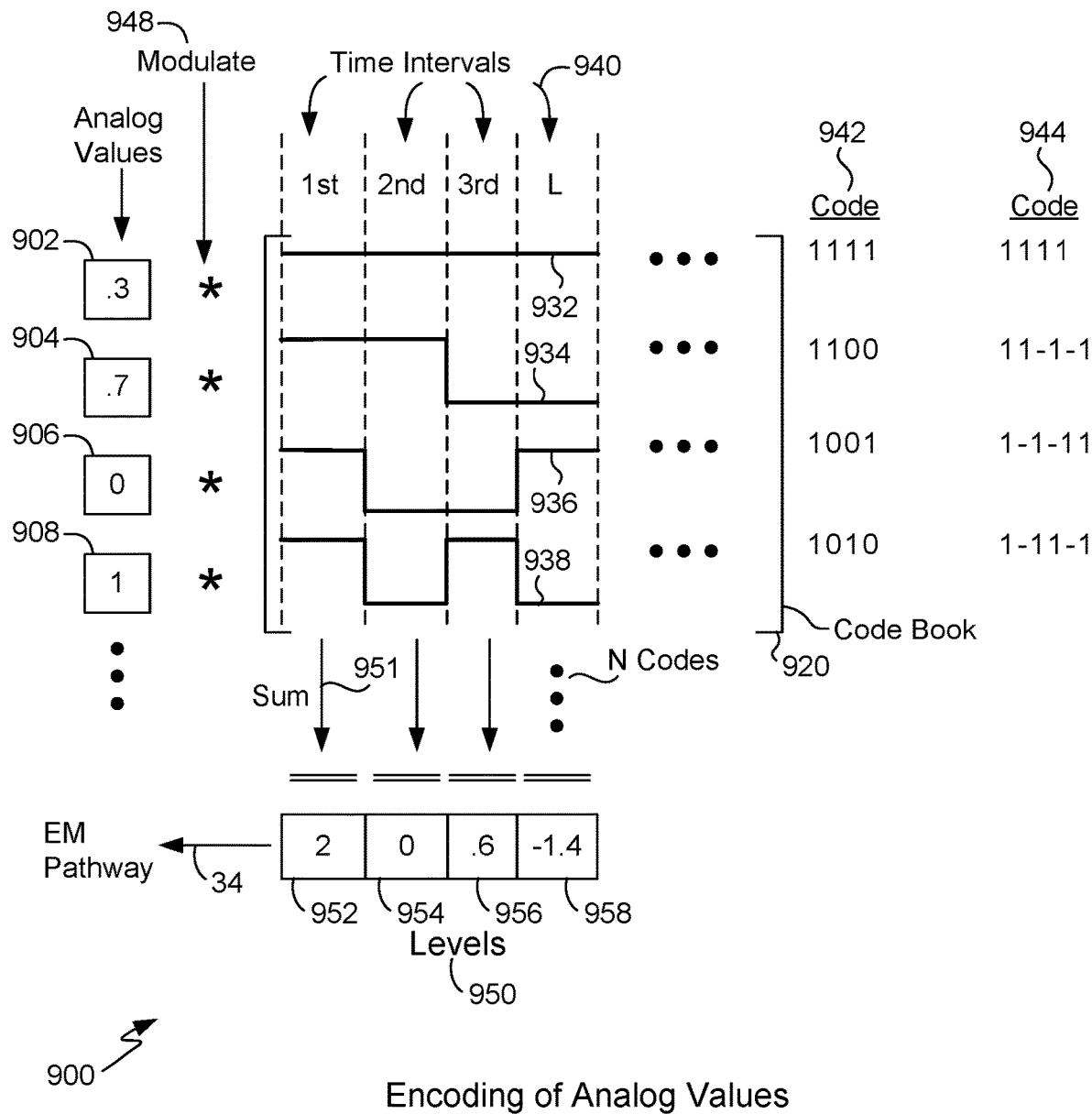
FIG. 22 illustrates an example showing how signal samples, in this case, analog values, are encoded within an encoder and then sent over an electromagnetic pathway.

FIG. 22 illustrates a simplistic example showing how signal samples, in this case, analog values, are encoded within an encoder and then sent over an electromagnetic pathway. Shown is an input vector of N analog values 902-908 which represent voltages of individual pixels within a video frame. These voltages may represent luminosity of a black-and-white image or luminosity of a particular color value in a pixel, e.g., an R, G or B color value of the pixel, i.e., each value represents a sensed or measured amount of light in the designated color space. Although pixel voltages are used in this example, this encoding technique may be used with voltages representing any of a variety of signals from a sensor such LIDAR values, sound values, haptic values, aerosol values, etc., and the analog values may represent other samples such as current, etc. Signal samples that are digital values may also be encoded and this digital encoding is explained below. Further, even though one encoder and one EM pathway is shown, an embodiment of the invention works well with multiple encoders, each transmitting over an EM pathway.

Preferably, the range of these voltages is from 0 to 1 V for efficiency, although a different range is possible. These voltages typically are taken from pixels in a row of a frame in a particular order, but another convention may be used to select and order these pixels. Whichever convention is used to select these pixels and to order them for encoding, that same convention will be used at the receiving end by the decoder in order to decode these voltages in the same order and then to place them in the resulting frame where they belong. By the same token, if the frame is in color and uses RGB, the convention in this encoder may be that all of the R pixel voltages are encoded first, and then the G and B voltages, or the convention may be that voltages 902-906 are the RGB values of a pixel in that row and that the next three voltages 908-912 represent the RGB values of the next pixel, etc. Again, the same convention used by this encoder to order and encode voltages will be used by the decoder at the receiving end. Any particular convention for ordering analog values 902-908 (whether by color value, by row, etc.) may be used as long as the decoder uses the same convention. As shown, any number of N analog values 902-908 may be presented for encoding at a time using code book 920, limited only by the number of entries in the code book.

As mentioned, code book 920 has any number of N codes 932-938; in this simple example the code book has four codes meaning that four analog values 902-908 are encoded at a time. A greater number of codes such as 127 codes, 255 codes, etc., may be used, but due to practical considerations such as circuit complexity, fewer codes are preferably used.

As known in the art, code book 920 includes N mutually-orthogonal codes each of length L; in this example L=4. Typically, each code is an SSDS code, but need not necessarily be a spreading code as discussed herein. As shown, each code is divided into L time intervals (also called "chips") and each time interval includes a binary value for that code. As shown at code representation 942, code 934 may be represented in the traditional binary form "1100", although that same code may also be represented as "1 1 −1 −1" as shown in code representation 944 for ease-of-use in modulating the value as will be explained below. Codes 932 and 936-938 may also be represented as in 942 or in 944. Note that each code of length L is not associated with a different computing device (such as a telephone), a different person or a different transmitter, as is done in CDMA.

Therefore, in order to send the four analog values 902-908 over a transmission medium 34 to a receiver (with a corresponding decoder) the following technique is used. Each analog value will be modulated by each chip in the representation 944 of its corresponding code; e.g., value 902, namely 0.3, is modulated 948 by each chip in the representation 944 of code 932 sequentially in time. Modulation 948 may be the multiplication operator. Thus, modulating 0.3 by code 932 results in the series "0.3, 0.3, 0.3, 0.3". Modulating 0.7 by code 934 becomes "0.7, 0.7, −0.7, −0.7"; value "0" becomes "0, 0, 0, 0"; and "value "1" becomes "1, −1, 1, −1". Typically, the first chip of each code modulates its corresponding analog value, and then the next chip of each code modulates its analog value, although an implementation may also modulate a particular analog value by all the chips of its code before moving on to the next analog value.

Each time interval, the modulated analog values are then summed 951 (perceived vertically in this drawing) to obtain analog output levels 952-958; e.g., the summation of modulated values for these time intervals results in output levels of 2, 0, 0.6, −1.4. These analog output levels 952-958 may be further normalized or amplified to align with a transmission line's voltage restrictions, and may then be sent sequentially in time as they are produced over an electromagnetic pathway (such as a differential twisted-pair) of transmission medium 34 in that order. A receiver then receives those output levels 952-958 in that order and then decodes them using the same code book 920 using the reverse of the encoding scheme shown here. The resultant pixel voltages 902-908 may then be displayed in a frame of a display at the receiving end in accordance with the convention used. Thus, analog values 902-908 are effectively encoded synchronously and sent over a single electromagnetic pathway in a sequential series of L analog output levels 952-958. Numerous encoders and electromagnetic pathways may also be used as shown and described herein. Further, the number of N samples that can be encoded in this manner depends upon the number of orthogonal codes used in the code book.

Advantageously, even though the use of robust SSDS techniques (such as spreading codes) results in a significant drop in bandwidth, the use of mutually-orthogonal codes, the modulation of each sample by chips of its corresponding code, summation, and the transmission of N samples in parallel using L output levels results in a significant bandwidth gain. In contrast with traditional CDMA techniques in which binary digits are encoded serially and then summed, the present invention first modulates the entire sample (i.e., the entire analog or digital value, not a single bit) by each chip in a corresponding code, and then sums those modulations at each time interval of the codes to obtain a resultant analog voltage level for each particular time interval, thus exploiting the amplitude of the resultant waveform. It is these analog output levels that are sent over a transmission medium, not representations of binary digits. Further, the present invention facilitates sending analog voltages from one video source to another video sink, i.e., from endpoint to endpoint, unlike CDMA techniques which allow for multiple access by different people, different devices or different sources, and send to multiple sinks. Moreover, compression is not required for the transport of the sample values.

Figure 23:
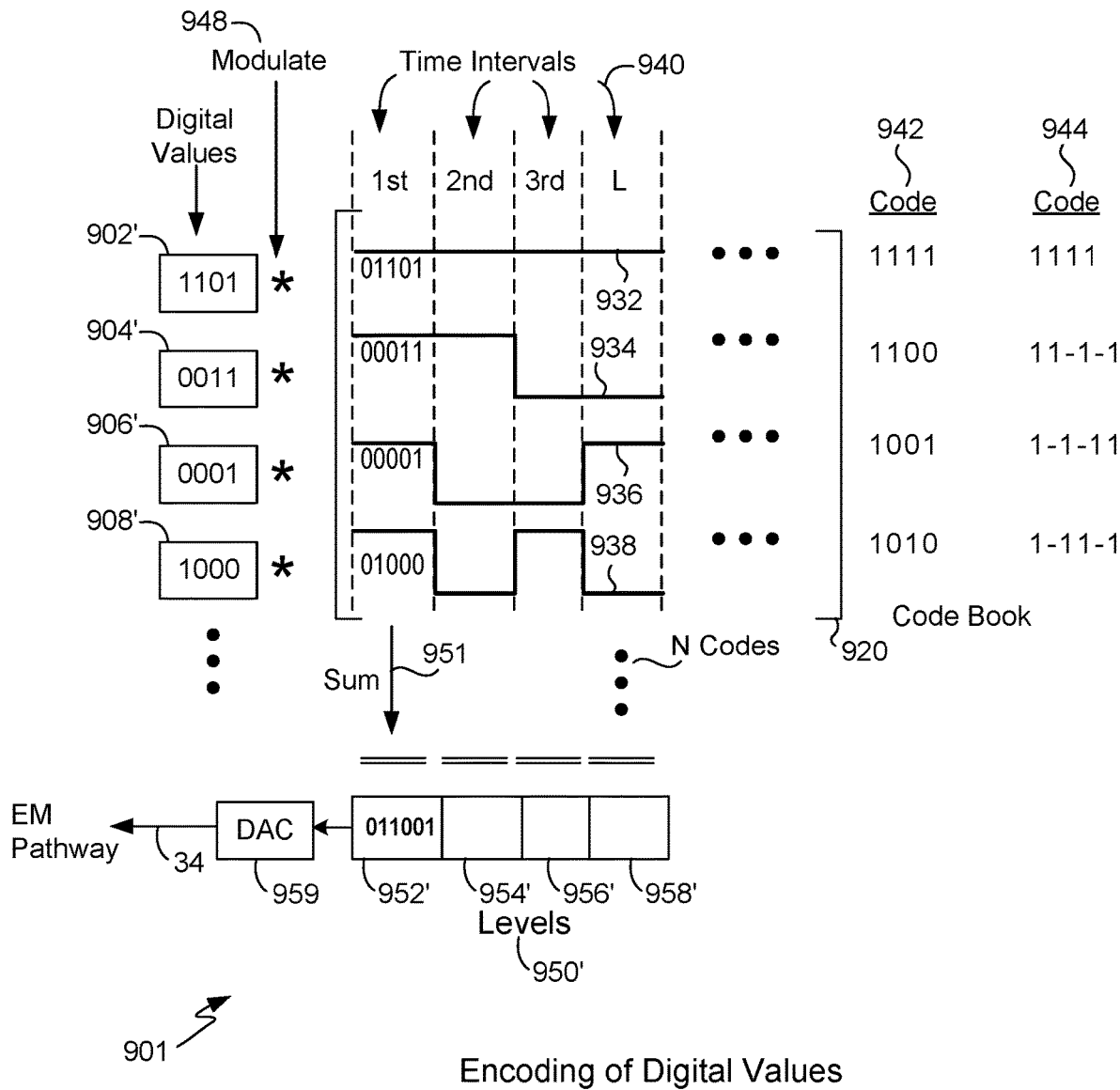
FIG. 23 illustrates a novel encoding technique as being applicable to signal samples that are digital values.

FIG. 23 illustrates this novel encoding technique as being applicable to signal samples that are digital values. Here, digital values 902'-908' are digital representations of voltages. Using a different example of voltages, value 902' is "1101" value 904' is "0011," value 906' is "0001," and value 908' is "1000." Each digital value is modulated (digitally multiplied) by the representation 944 of each code, that is by "1" or by "−1" depending upon the chip of the code corresponding to the digital value to be modulated. Considering only the first time interval 940 of each code, and adding a most significant bit (MSB) which is the sign bit, modulating "1101" yields "01101" (the MSB "0" meaning a positive value), modulating "0011" yields "00011", modulating "0001" yields "00001," and modulating "1000" yields "01000." These modulated values are shown annotated on the first time interval. (Although not shown, modulating by a −1 chip yields a negative value which may be expressed in binary using a suitable binary representation for negative values.)

Summing digitally, these modulated values in the first time interval yields digital value 952' "011001" (again, the MSB is the sign bit); the other digital values 954'-958' are not shown in this example, but are calculated in the same way. Considering this summation in base 10, one can verify that the modulated values 13, 3, 1 and 8 do sum to 25. Although not shown in this example, typically additional MSBs will be available for the resultant levels 952'-958' in that the sum may require more than five bits. For example, if values 902'-908' are represented using four bits, then levels 952'-958' may be represented using up to ten bits, in the case where there are 64 codes (adding log 2 of 64 bits). Or, if 32 modulated values are summed then five more bits will be added. The number of bits needed for the output levels will depend upon the number of codes.

The output levels 950' may be first normalized to adjust to the DAC's input requirements and then fed sequentially into a DAC 959 for conversion of each digital value into its corresponding analog value for transmission over the EM pathway. DAC 959 may be a MAX5857 RF DAC (includes a clock multiplying PLL/VCO and a 14-bit RF DAC core, and the complex path may be bypassed to access the RF DAC core directly), and may be followed by a bandpass filter and then a variable gain amplifier (VGA), not shown. In some situations the number of bits used in levels 950' are greater than the number allowed by DAC 959, e.g., level 952' is represented by ten bits but DAC 959 is an 8-bit DAC. In these situations, the appropriate number of LSBs are discarded and the remaining MSBs are processed by the DAC, with no loss in visual quality of the resultant image at the display.

Advantageously, entire digital values are modulated, and then these entire modulated digital values are summed digitally to produce a digital output level for conversion and transmission. This technique is different from CDMA which modulates each binary digit of a digital value and then sums these modulated bits to produce outputs. For example, assuming that there are B bits in each digital value, with CDMA, there will be a total of B*L output levels to send, whereas with this novel digital (or analog) encoding technique there will only be a total of L output levels to send, thus having an advantage.

Figure 24:
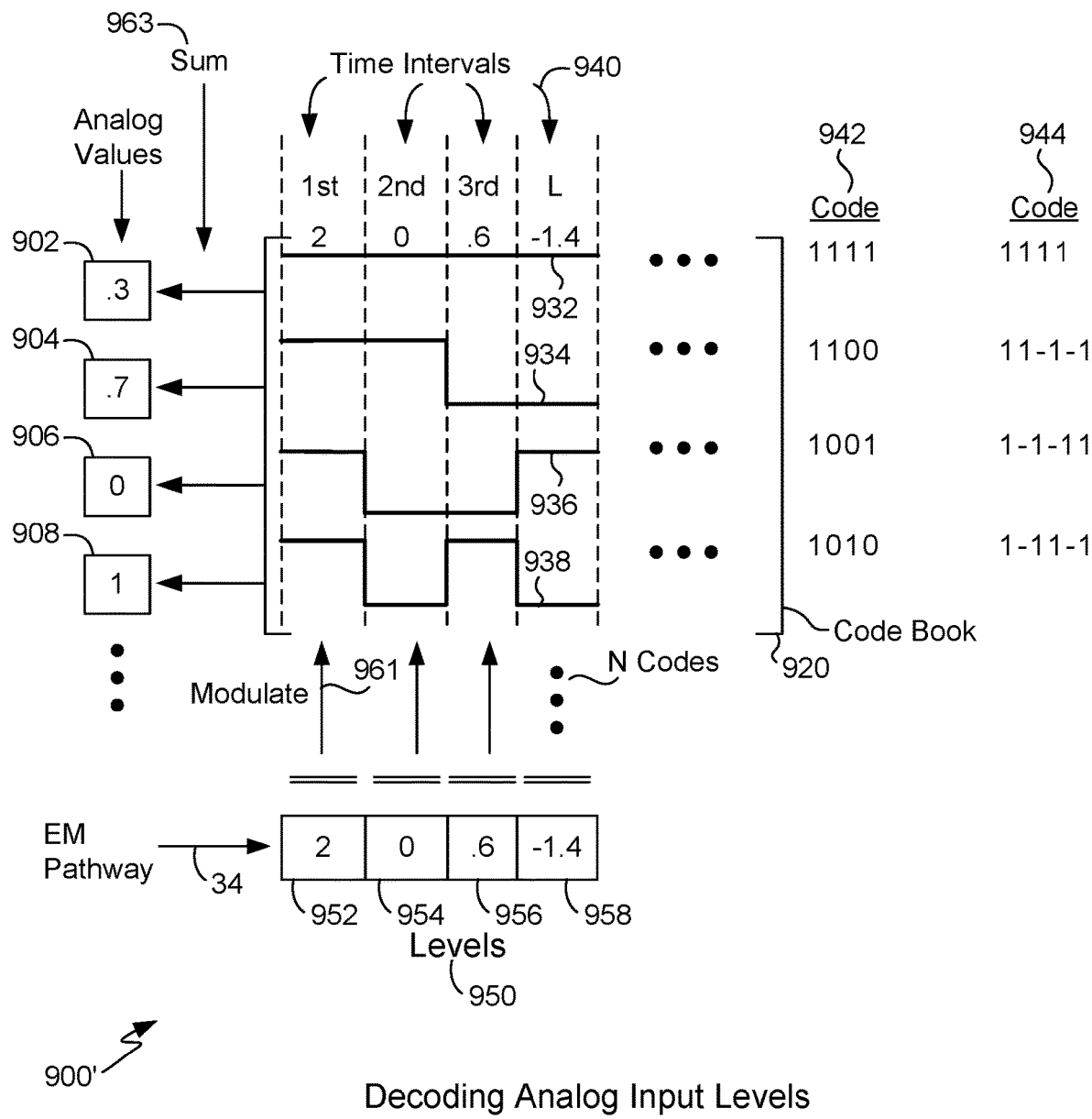
FIG. 24 illustrates decoding of analog input levels that were encoded using the encoder of FIG. 22.

FIG. 24 illustrates decoding of analog input levels that were encoded using the encoder of FIG. 22. As shown, L input levels 950 have been received over a single electromagnetic pathway of a transmission medium 34. As described herein and noted earlier, code book 920 includes N orthogonal codes 932-938 that will be used to decode input levels 950 to produce an output vector of N analog values 902-908, i.e., the same analog values 902-908 that were encoded above. To perform decoding, as indicated by the vertical arrows, each input level 952-958 is modulated 961 by each chip of each code corresponding to a particular index in the output vector 902-908. Considering modulation of levels 952-958 by the first code 932, such modulation produces the series of modulated values "2, 0, 0.6, −1.4". Modulation of levels 952-958 by the second code 934 produces the series of modulated values "2, 0, −0.6, 1.4". Modulation by the third code 936 produces "2, 0, −0.6, −1.4", and modulation by the fourth code 938 produces "2, 0, 0.6, 1.4".

Next, as indicated by the horizontal arrows, each series of modulated values is summed in order to produce one of the analog values 902-908. For example, the first series is summed to produce the analog value "1.2" (which becomes "0.3" after being normalized using the scale factor of "4). In a similar fashion, the other three series of modulated values are summed to produce the analog values "2.8", "0" and "4", and after being normalized yield the output vector of analog values 902-908. Each code may modulate the input levels and then that series may be summed, or, all may modulate the input levels before each series is summed. Thus, the output vector of N analog values 902-908 has been transported in parallel using L output levels.

Not shown in these examples is an example of decoding digital input levels, although one of skill in the art will find it straightforward to perform such decoding upon reading the encoding of digital values in the above description.

Figure 25A:
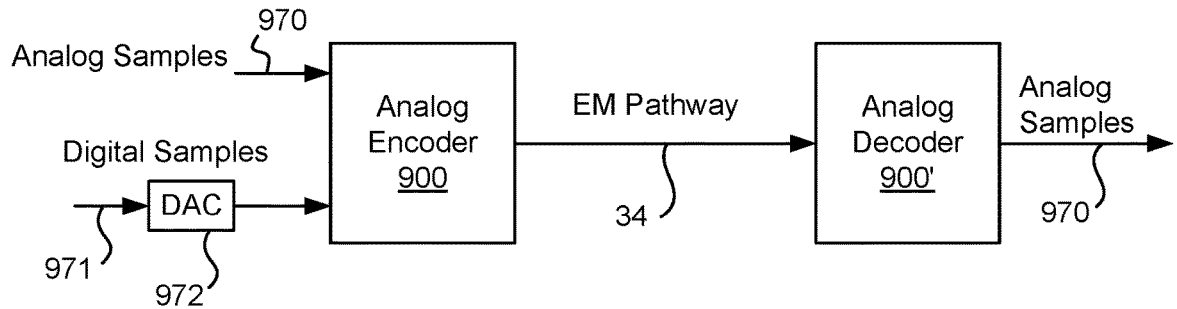
FIG. 25A illustrates use of an analog encoder and a corresponding analog decoder.
Figure 25B:
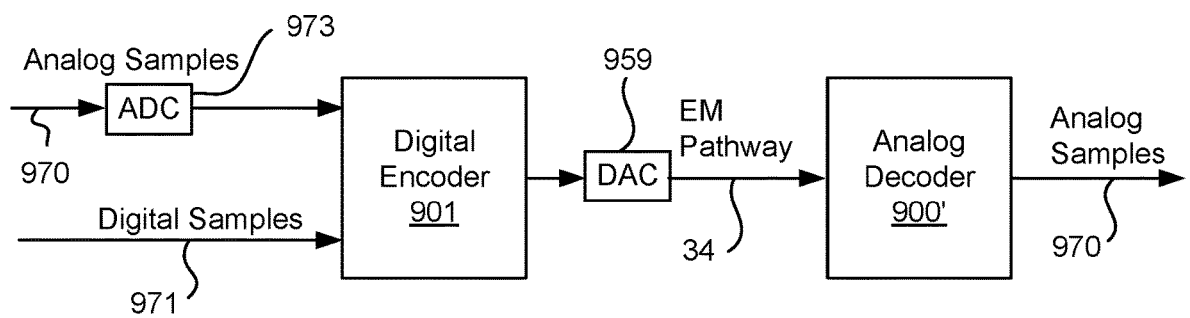
FIG. 25B illustrates use of a digital encoder and a corresponding analog decoder.
Figure 25C:
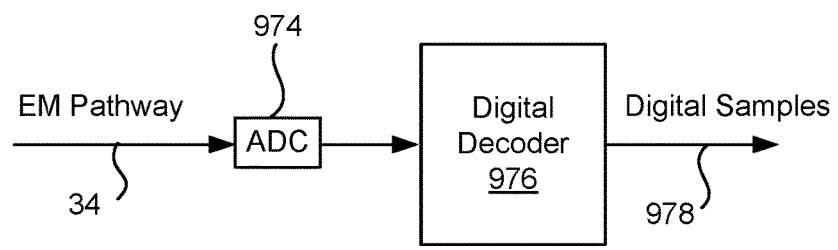
FIG. 25C illustrates use of a digital decoder to decode encoded analog signals that have arrived over an electromagnetic pathway.

FIGS. 25A, 25B and 25C illustrate that the encoders and decoders may operate upon either analog samples or digital samples; the various analog and digital encoders and decoders have previously been described above. As explained above, there may be more than one EM pathway and accordingly more than one encoder/decoder pair and a corresponding number of DACs or ADCs as the case may be.

FIG. 25A illustrates use of an analog encoder and a corresponding analog decoder. Input into analog encoder 900 are either analog samples 970 or digital samples 971 that have been converted into analog by a DAC 972 located at the analog encoder. In this fashion, either analog or digital samples that arrive at the analog encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 25B illustrates use of a digital encoder and a corresponding analog decoder. Input into digital encoder 901 are either digital samples 971 or analog samples 970 that have been converted into digital by an ADC 973 located at the digital encoder. As the encoder is digital, a DAC 959 located at the encoder converts the encoded samples into analog before transmission over the electromagnetic pathway. In this fashion, either analog or digital samples that arrive at the digital encoder may be encoded for transmission over an electromagnetic pathway on transmission medium 34. Analog decoder 900' decodes the encoded analog samples to produce analog samples 970 for output. Analog samples 970 may be used as is or may be converted into digital samples using an ADC (not shown).

FIG. 25C illustrates use of a digital decoder to decode encoded analog signals that have arrived over an electromagnetic pathway on transmission medium 34. The encoded analog signals may been transmitted using either the analog encoder or the digital encoder described immediately above. An ADC 974 located at digital decoder 976 receives the encoded analog samples sent via the electromagnetic pathway and converts the samples into digital. These encoded digital samples are then decoded by digital decoder 976 into digital samples 978 (corresponding to the values of an input vector of samples that was originally encoded before transmission over the electromagnetic pathway). Digital samples 978 may be used as is or may be converted into analog samples using a DAC.

Figure 26:
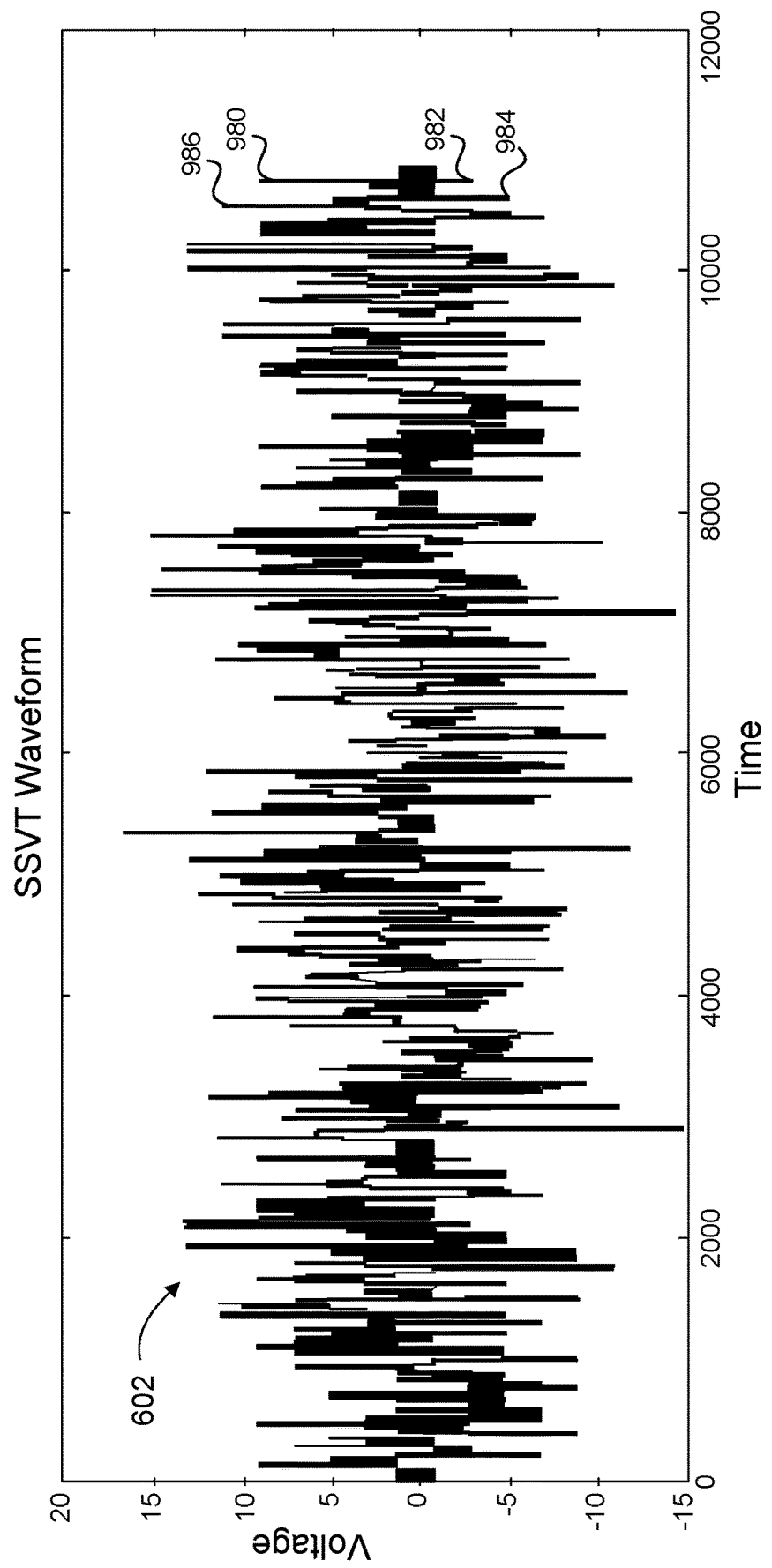
FIG. 26 shows a simulation of an SSVT waveform sent via an electromagnetic pathway.

FIG. 26 shows a simulation (similar to an idealized oscilloscope trace) of an SSVT waveform 602 sent via an electromagnetic pathway after being output from an analog encoder (or after being digitally encoded and then converted by a DAC). The vertical scale is voltage, and the horizontal scale is a 100 ps oscilloscope measurement time interval. Note that SSVT signal 602 is an analog waveform rather than a digital signal (i.e., the signal does not represent binary digits) and in this embodiment can transport a range of voltages from about −15 V up to about +15 V. The voltage values of the analog waveform are (or at least can be) fully analog. Also, voltages are not limited to some maximum value, although high values are impractical.

As previously explained, analog voltage levels are sent sequentially over an electromagnetic pathway, each level being the summation of modulated samples per time interval, such as the analog output levels 952-958 above or the digital output levels 952'-958' above (after being passed through a DAC). When sent, these output levels then appear as a waveform such as waveform 602. In particular, voltage level 980 represents the summation in a particular time interval of modulated samples (i.e., an output level). Using a simplistic example, sequential voltage levels 980-986 represent the transmission of four output levels. In this example, 32 codes are used, meaning that 32 samples may be transmitted in parallel; thus, voltage levels 980-986 (followed by a number of subsequent voltage levels, depending upon the number of chips in a code, L) form the transmission in parallel of 32 encoded samples (such as pixel voltages from a video source). Subsequent to that transmission, the next set of L voltage levels of waveform 602 represent the transmission of the next 32 samples. In general, waveform 602 represents the encoding of analog or digital values into analog output levels, and the transmission of those levels in discrete time intervals to form a composite analog waveform.

Due to such phenomena as attenuation, reflections due to impedance mismatches, and impinging aggressor signals, every electromagnetic pathway degrades electromagnetic signals that propagate through it, and thus measurements taken of input levels at a receiving terminal are always subject to error with respect to corresponding output levels made available at the transmitting terminal. Hence, scaling of input levels at a receiver (or normalization or amplification of output levels at a transmitter) may be performed to compensate, as is known in the art. Further, due to process gain (i.e., due to an increase in L which also increases electrical resilience) decoded input levels at a decoder are normalized by a scale factor using the code length to recover the transmitted output levels as is known in the art.

I claim:

1. A transmitter for communicating an input payload over one or more electromagnetic pathways, said input payload including one or more signals and each signal including an ordered sequence of digital samples, said transmitter comprising:
   a first memory bank into which a predetermined quantity of digital samples of said input payload is repeatedly distributed according to a first predetermined permutation to create as many first input vectors of digital samples as there are said one or more electromagnetic pathways;
   a second memory bank into which each of said first input vectors available from said first memory bank are repeatedly stored to create second input vectors of digital samples;
   a third memory bank into which each of said second input vectors available from said second memory bank are repeatedly stored to create third input vectors of digital samples;
   a plurality of drivers, each driver arranged to receive one of said third input vectors as an ordered series of L digital output values, where L>=2; and
   a digital-to-analog converter (DAC) for each driver, each DAC arranged to convert one of said series of L digital output values into a series of L analog output levels, wherein each driver being further arranged to transmit said respective series of L analog output levels over a respective one of said one or more electromagnetic pathways from said transmitter to a receiver, wherein said transmitter and said receiver both being implemented within a common enclosure of a video equipment.

2. The transmitter as recited in claim 1, wherein each of said third input vectors is of length N and where L=N.

3. The transmitter as recited in claim 2, further comprising:
   an encoder for each of said third input vectors that encodes said digital samples of one of said third input vectors using N codes of a code set of N codes each of length L into said respective L digital output values, each of said N codes being associated with one of said digital samples of each third input vector, wherein said code set is an identity matrix and chip values in said code set are constrained to be "+1" or "0".

4. The transmitter as recited in claim 1, further comprising:
   an encoder for each of said third input vectors that encodes said digital samples of one of said third input vectors using N codes of a code set of N mutually-orthogonal codes each of length L into said respective L digital output values, each of said N codes being associated with one of said digital samples of each third input vector.

5. The transmitter as recited in claim 1, wherein said video equipment is a television, a monitor, an automotive display, retail signage, a retail display, a kiosk display or an immersive virtual reality (iVR) display.

6. The transmitter as recited in claim 1, further comprising:
   a permutation controller arranged to execute said first predetermined permutation, to execute a second predetermined permutation when storing said first input vectors into said second input vectors, and to execute a third predetermined permutation when storing said second input vectors into said third input vectors.

7. The transmitter as recited in claim 1, wherein at least one location of one of said first input vectors contains a framing signal, a command or a control signal, or other signal, and wherein said framing signal, command or control signal, or other signal is transmitted over one of said one or more electromagnetic propagation pathways.

8. A transmitter for communicating an input payload over one or more electromagnetic pathways, said input payload including one or more signals and each signal including an ordered sequence of digital samples, said transmitter comprising:
   a first memory bank into which a predetermined quantity of digital samples of said input payload is repeatedly distributed under a first timing domain to create as many first input vectors of digital samples as there are said one or more electromagnetic pathways;
   a second memory bank into which each of said first input vectors available from said first memory bank are repeatedly stored under a second timing domain to create second input vectors of digital samples;
   a third memory bank into which each of said second input vectors available from said second memory bank are repeatedly stored under a third timing domain to create third input vectors of digital samples;
   a plurality of drivers, each driver arranged to receive one of said third input vectors as an ordered series of L digital output values, where L>=2; and
   a digital-to-analog converter (DAC) for each driver, each DAC arranged to convert one of said series of L digital output values into a series of L analog output levels, wherein said each driver being further arranged to transmit said respective series of L analog output levels over a respective one of said one or more electromagnetic pathways under a fourth timing domain from said transmitter to a receiver, wherein said transmitter and said receiver both being implemented within a common enclosure of a video equipment.

9. The transmitter as recited in claim 8, wherein each of said third input vectors is of length N and where L=N.

10. The transmitter as recited in claim 9, further comprising:
    an encoder for each of said third input vectors that encodes said digital samples of one of said third input vectors using N codes of a code set of N codes each of length L into said respective L digital output values, each of said N codes being associated with one of said digital samples of each third input vector, wherein said code set is an identity matrix and chip values in said code set are constrained to be "+1" or "0".

11. The transmitter as recited in claim 8, further comprising:
    an encoder for each of said third input vectors that encodes said digital samples of one of said third input vectors using N codes of a code set of N mutually-orthogonal codes each of length L into said respective L digital output values, each of said N codes being associated with one of said digital samples of each third input vector.

12. The transmitter as recited in claim 8, wherein said video equipment is a television, a monitor, an automotive display, retail signage, a retail display, a kiosk display or an immersive virtual reality (iVR) display.

13. The transmitter as recited in claim 8, wherein said first timing domain has a first clock rate freq(first clock), and wherein said fourth timing domain has a fourth clock rate freq(fourth clock) according to a relationship $$\text{freq(fourth clock)} = (S*L)/(P*N)*\text{freq(first clock)},$$
where S=quantity of said one or more signals;

P=quantity of said one or more electromagnetic pathways; and

N=quantity of elements in one of said first input vectors allocated to store said digital samples.

14. A transmitter as recited in claim 8, further comprising:

a bank counter that issues an end-of-bank signal to said second memory bank indicating to store said first input vectors from said first memory bank into said second memory bank; and a code counter that issues an end-of-bank signal to said third memory bank indicating to store said second input vectors from said second memory bank into said third memory bank, wherein said bank counter-issued end-of-bank signal is out of phase with said code counter-issued end-of-bank signal.

15. The transmitter as recited in claim 8, wherein at least one location of one of said first input vectors contains a framing signal, a command or a control signal, or other signal, and wherein said framing signal, command or control signal, or other signal is transmitted over one of said one or more electromagnetic propagation pathways.

\* \* \* \* \*